United States Patent
Oktavec et al.

(10) Patent No.: US 10,404,136 B2
(45) Date of Patent: Sep. 3, 2019

(54) POWER TOOL WITH SEPARATE MOTOR CASE COMPARTMENT

(71) Applicant: BLACK & DECKER INC., New Britain, CT (US)

(72) Inventors: Craig A. Oktavec, Forest Hill, MD (US); David J. Smith, Columbia, MD (US); Colin C. Crosby, Baltimore, MD (US); Matthew J. Velderman, Baltimore, MD (US); Zollie W. Privett, Jr., Baltimore, MD (US); Pradeep Pant, Cockeysville, MD (US); Kyle J. Christophersen, Lutherville-Timonium, MD (US); Daniel F. Nace, Towson, MD (US); James H. Stiles, III, Baltimore, MD (US); Floyd E. Moreland, IV, York, PA (US)

(73) Assignee: Black & Decker Inc., New Britain, CT (US)

( * ) Notice: Subject to any disclaimer, the term of this patent is extended or adjusted under 35 U.S.C. 154(b) by 356 days.

(21) Appl. No.: 15/262,069

(22) Filed: Sep. 12, 2016

(65) Prior Publication Data
US 2017/0110935 A1    Apr. 20, 2017

Related U.S. Application Data

(60) Provisional application No. 62/241,385, filed on Oct. 14, 2015, provisional application No. 62/249,528, (Continued)

(51) Int. Cl.
*H02K 7/14* (2006.01)
*B25F 5/02* (2006.01)
(Continued)

(52) U.S. Cl.
CPC .......... *H02K 7/145* (2013.01); *B24B 23/028* (2013.01); *B25F 5/02* (2013.01); *H02K 5/10* (2013.01);
(Continued)

(58) Field of Classification Search
CPC ... B25B 23/1475; B25B 21/02; B25B 21/026; B25B 23/1405; H02K 11/215;
(Continued)

(56) References Cited

U.S. PATENT DOCUMENTS 5,006,744 A * 4/1991 Archer ................... H02K 29/06
                                                    310/58
5,093,593 A * 3/1992 Philipp .............. A61B 17/1622
                                                    310/47

(Continued)

OTHER PUBLICATIONS

U.S. Appl. No. 15/262,053, filed Sep. 12, 2016, Z. W. Privett Jr.

*Primary Examiner* — Robert F Long
(74) *Attorney, Agent, or Firm* — Amir Rohani

(57) ABSTRACT

A handheld grinder includes an elongated housing, an electric motor, an output shaft, a wall, a planar circuit board, and a motor drive circuit. The elongated housing defines a cavity therein and includes a motor case disposed at a front end and a handle portion to a rear end. The electric motor has a drive shaft that is mounted within the motor case. The output shaft is drivably coupled to the drive shaft of the electric motor. The wall separates the cavity between the motor case and the handle portion of the housing. The planar circuit board disposed in the handle portion of the housing. The motor drive circuit is accommodated entirely within the handle portion of the housing on the planar circuit board.

19 Claims, 27 Drawing Sheets

Related U.S. Application Data filed on Nov. 2, 2015, provisional application No. 62/322,462, filed on Apr. 14, 2016.

(51) Int. Cl.

| | | |
|---|---|---|
| *B24B 23/02* | (2006.01) | |
| *H02K 11/215* | (2016.01) | |
| *H02K 11/33* | (2016.01) | |
| *H02K 5/10* | (2006.01) | |
| *H02K 5/16* | (2006.01) | |
| *H02K 5/22* | (2006.01) | |
| *H02K 7/116* | (2006.01) | |
| *H02K 9/06* | (2006.01) | |

(52) U.S. Cl.
CPC .......... *H02K 11/215* (2016.01); *H02K 11/33* (2016.01); *H02K 5/161* (2013.01); *H02K 5/225* (2013.01); *H02K 7/116* (2013.01); *H02K 9/06* (2013.01)

(58) Field of Classification Search
CPC ........ H02K 7/145; H02K 11/33; H02K 21/24; H02K 11/30; H02K 11/44; H02K 5/10; H02K 9/06; H02K 7/116; H02K 5/225; H02K 5/161; B25D 2250/221; B25F 5/02; B24B 23/028
USPC .................. 173/2, 90, 93, 176–178, 213
See application file for complete search history.

(56) References Cited

U.S. PATENT DOCUMENTS

| | | | | |
|---|---|---|---|---|
| 5,422,769 | A * | 6/1995 | Elsaesser | G11B 17/038 360/99.08 |
| 7,021,400 | B2 * | 4/2006 | Oretti | B23B 31/123 173/176 |
| 7,036,605 | B2 * | 5/2006 | Suzuki | B25B 21/02 173/176 |
| 7,494,437 | B2 * | 2/2009 | Chen | B25B 21/02 173/216 |
| 7,896,097 | B2 * | 3/2011 | Teng | B25B 21/02 173/178 |
| 8,816,544 | B2 | 8/2014 | Tanimoto et al. | |
| 9,314,855 | B2 * | 4/2016 | Ookubo | B23B 45/02 |
| 9,314,900 | B2 | 4/2016 | Vanko et al. | |
| 9,314,908 | B2 * | 4/2016 | Tanimoto | B25B 21/02 |
| 9,450,476 | B2 * | 9/2016 | Ito | H02K 11/38 |
| 2003/0226674 | A1 * | 12/2003 | Putney | B25B 23/1453 173/176 |
| 2004/0089528 | A1 * | 5/2004 | Totsu | B25B 21/00 200/293.1 |
| 2005/0199404 | A1 * | 9/2005 | Furuta | B25B 21/00 173/48 |
| 2008/0135269 | A1 * | 6/2008 | Friberg | B25B 23/1405 173/93.5 |
| 2008/0170841 | A1 * | 7/2008 | Schneider | A61B 17/32002 388/800 |
| 2008/0223894 | A1 * | 9/2008 | Cruise | B25C 1/008 227/2 |
| 2009/0207035 | A1 | 8/2009 | Watanabe et al. | |
| 2009/0255700 | A1 * | 10/2009 | Lehnert | B25B 21/026 173/104 |
| 2011/0171887 | A1 * | 7/2011 | Tanimoto | B24B 23/028 451/359 |
| 2011/0220381 | A1 * | 9/2011 | Friese | B25F 5/02 173/217 |
| 2011/0232930 | A1 * | 9/2011 | Zhang | B25F 5/001 173/178 |
| 2012/0199372 | A1 * | 8/2012 | Nishikawa | B25B 23/1475 173/132 |
| 2012/0234566 | A1 * | 9/2012 | Mashiko | B25B 21/02 173/93.5 |
| 2012/0279736 | A1 * | 11/2012 | Tanimoto | B25B 21/02 173/2 |
| 2012/0292065 | A1 * | 11/2012 | Hoshi | B25B 21/02 173/93 |
| 2012/0318550 | A1 * | 12/2012 | Tanimoto | B25B 23/1405 173/117 |
| 2013/0021783 | A1 * | 1/2013 | Vanko | B25F 5/021 362/119 |
| 2013/0062088 | A1 * | 3/2013 | Mashiko | B25B 21/02 173/2 |
| 2013/0075121 | A1 * | 3/2013 | Nakamura | B25B 21/02 173/94 |
| 2013/0126202 | A1 * | 5/2013 | Oomori | B25B 21/00 173/217 |
| 2013/0333910 | A1 * | 12/2013 | Tanimoto | B25B 21/02 173/176 |
| 2013/0334920 | A1 * | 12/2013 | Kim | H02K 5/1732 310/88 |
| 2014/0091683 | A1 * | 4/2014 | Ito | B62D 5/0406 310/68 R |
| 2014/0158390 | A1 * | 6/2014 | Mashiko | B25B 21/00 173/47 |
| 2014/0196920 | A1 * | 7/2014 | Wirnitzer | B25F 5/00 173/1 |
| 2015/0041167 | A1 * | 2/2015 | Yamaguchi | H02K 3/26 173/46 |
| 2015/0111480 | A1 | 4/2015 | Vanko et al. | |
| 2015/0364972 | A1 * | 12/2015 | Ito | H02K 7/145 310/50 |
| 2016/0129568 | A1 * | 5/2016 | Nishikawa | B25B 21/026 173/93 |
| 2016/0141939 | A1 * | 5/2016 | Aoyama | H02K 21/22 310/68 B |
| 2016/0149474 | A1 * | 5/2016 | Smith | H02K 1/276 310/50 |
| 2016/0354911 | A1 * | 12/2016 | Aoki | B25F 5/00 |
| 2017/0099025 | A1 * | 4/2017 | Ma | B25F 5/00 |
| 2017/0106522 | A1 | 4/2017 | Coates et al. | |
| 2017/0110935 | A1 | 4/2017 | Oktavec et al. | |
| 2017/0110945 | A1 | 4/2017 | Crosby et al. | |
| 2017/0110946 | A1 | 4/2017 | Oktavec et al. | |
| 2017/0136614 | A1 * | 5/2017 | Takeda | B25F 5/00 |
| 2017/0151657 | A1 * | 6/2017 | Nagasaka | H02K 11/33 |
| 2017/0165824 | A1 * | 6/2017 | Takeda | B25F 5/00 |
| 2017/0264219 | A1 * | 9/2017 | Takeda | B25F 5/00 |
| 2017/0274520 | A1 * | 9/2017 | Christophersen | B24B 23/02 |
| 2017/0326720 | A1 * | 11/2017 | Kuroyanagi | B25F 5/02 |
| 2017/0341213 | A1 | 11/2017 | Mashiko et al. | |
| 2018/0029148 | A1 * | 2/2018 | Suzuki | B25F 5/008 |
| 2018/0050398 | A1 * | 2/2018 | Kumakura | B23D 45/16 |
| 2018/0056497 | A1 | 3/2018 | Chen et al. | |
| 2018/0085884 | A1 | 3/2018 | Liaw et al. | |
| 2018/0099372 | A1 | 4/2018 | Takeda et al. | |
| 2018/0111259 | A1 * | 4/2018 | Takeda | B25F 5/00 |
| 2018/0117728 | A1 * | 5/2018 | Kawakami | B25F 5/026 |
| 2018/0236572 | A1 * | 8/2018 | Ukai | B23D 51/16 |
| 2018/0241281 | A1 * | 8/2018 | Doan | H02K 11/215 |
| 2018/0281146 | A1 * | 10/2018 | Tomonaga | B24B 23/022 |
| 2019/0039227 | A1 * | 2/2019 | Takeda | B25F 5/008 |

\* cited by examiner

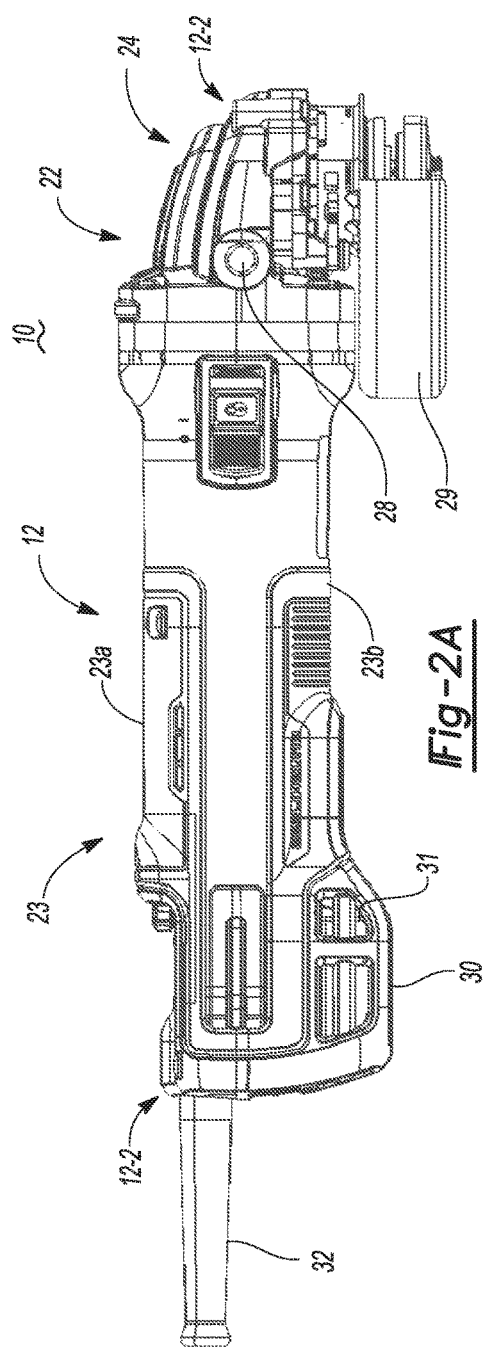
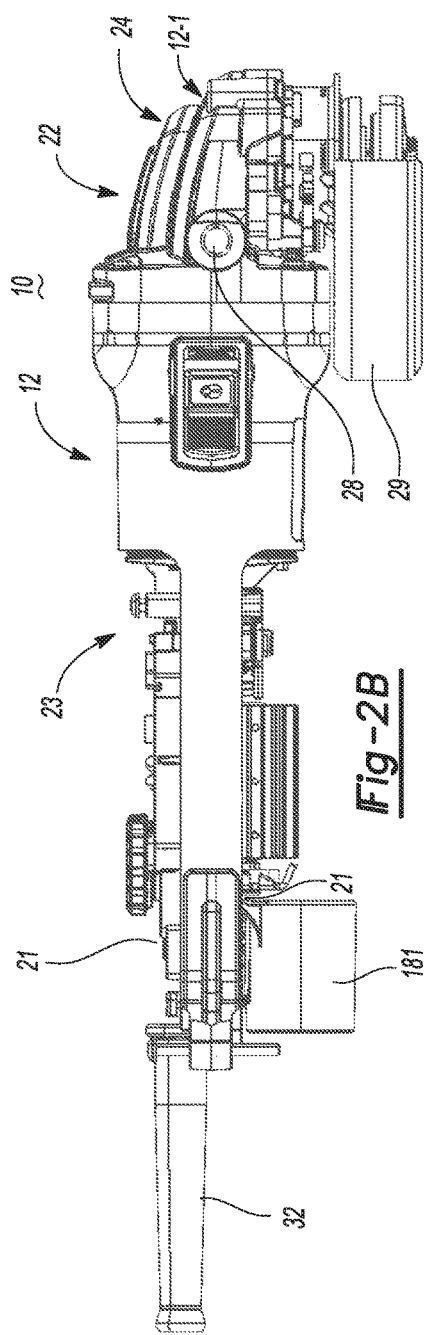

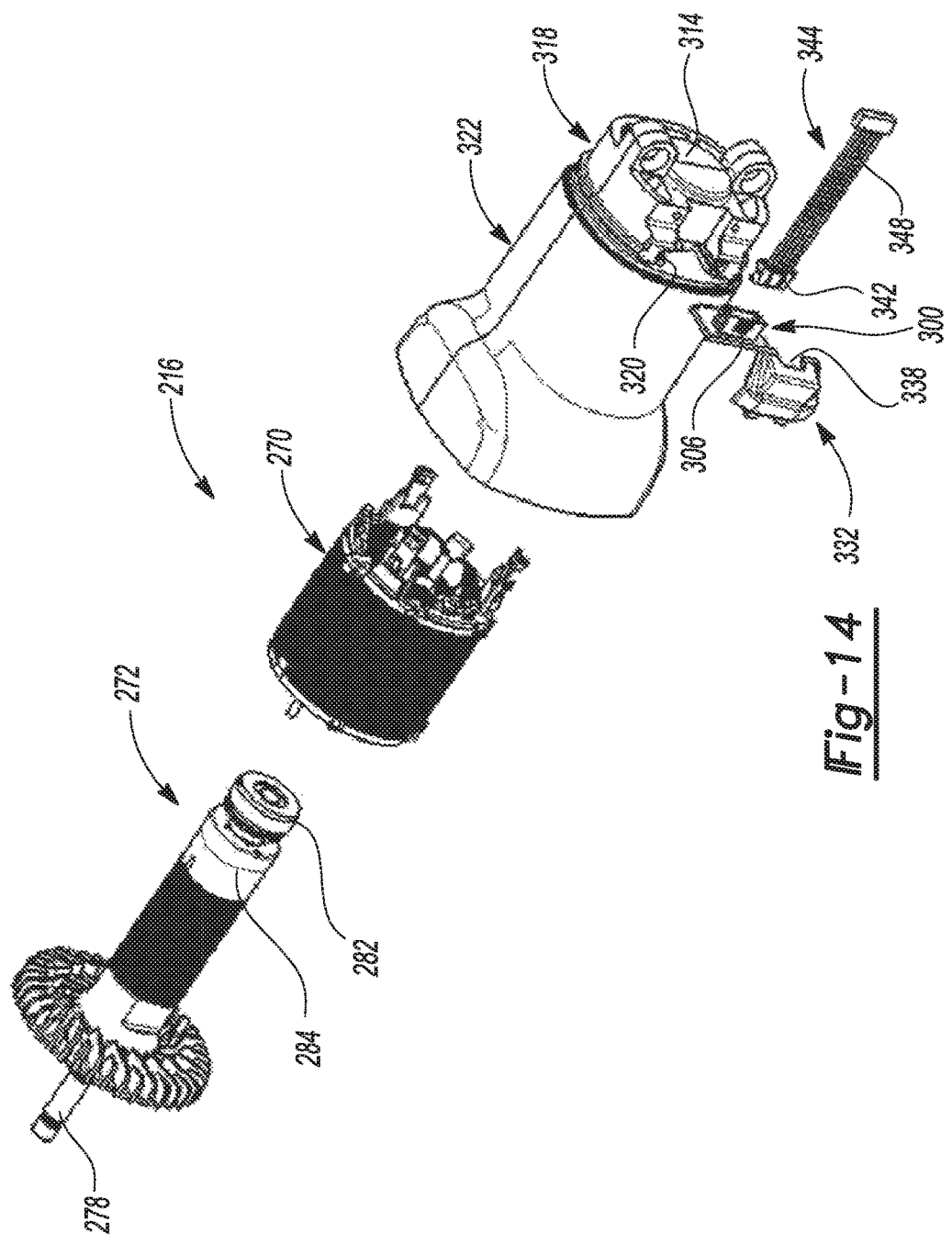

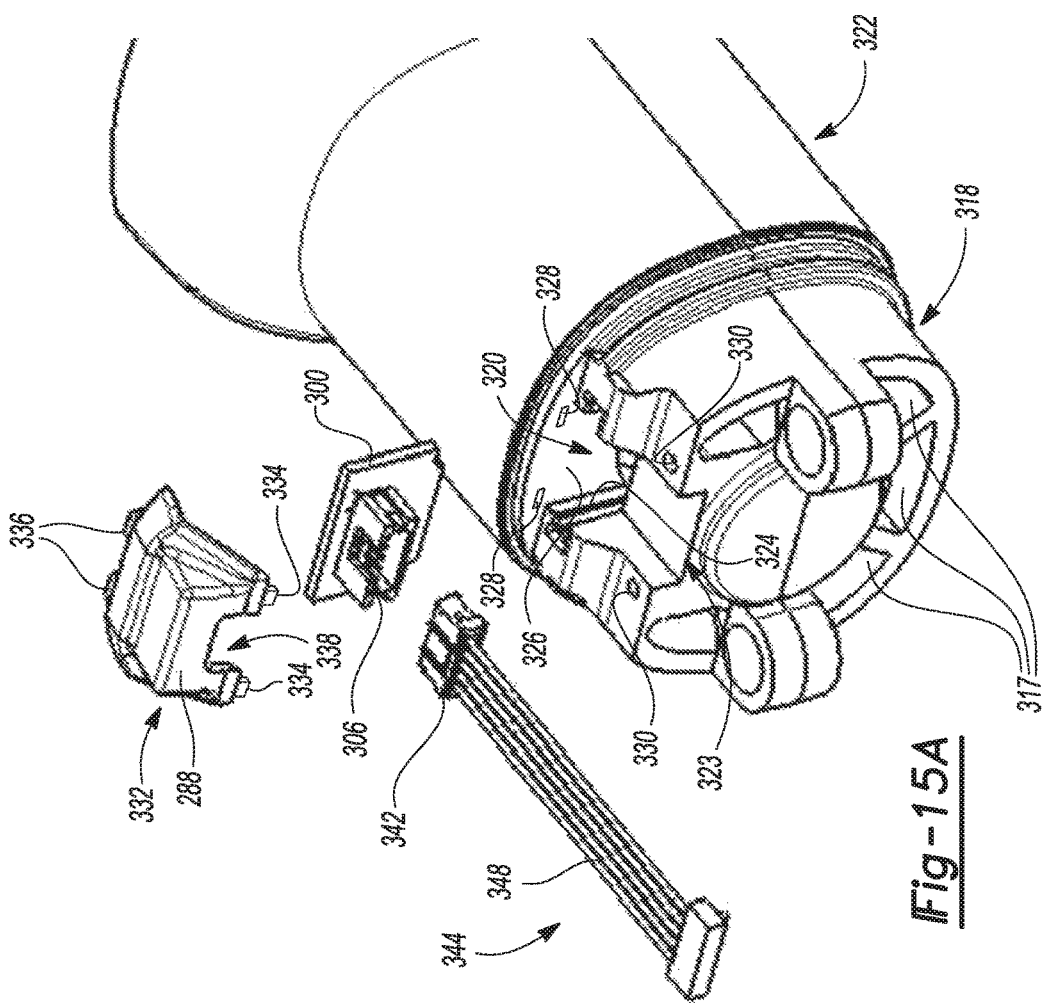

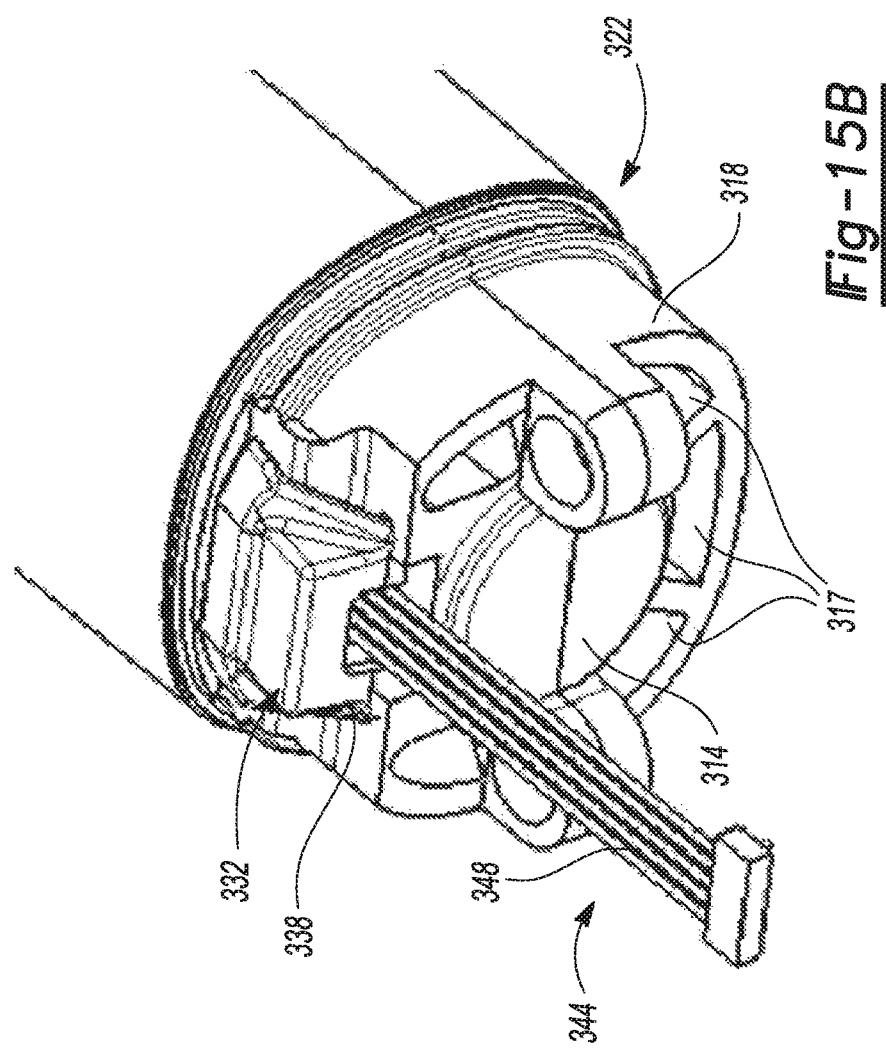

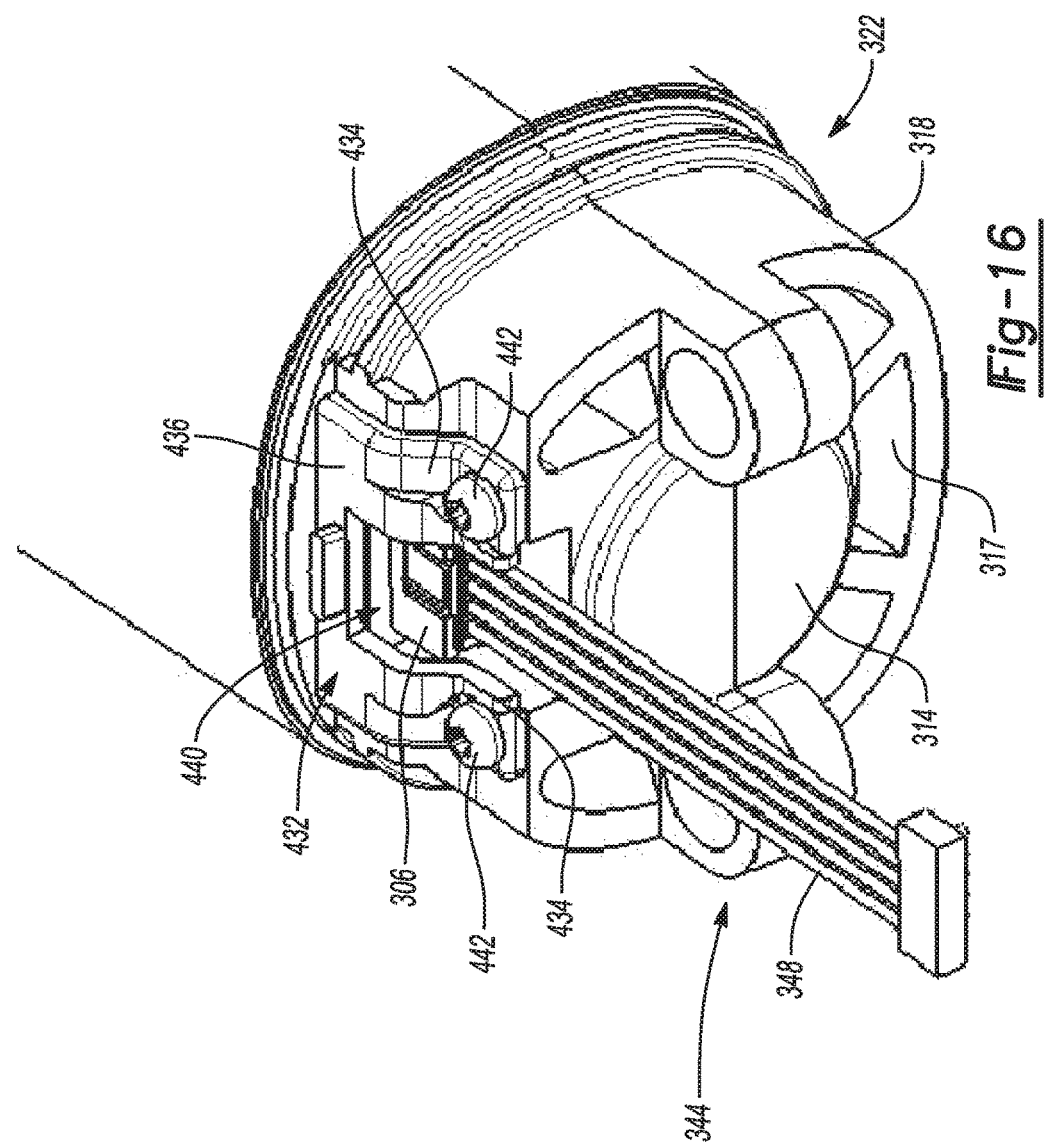

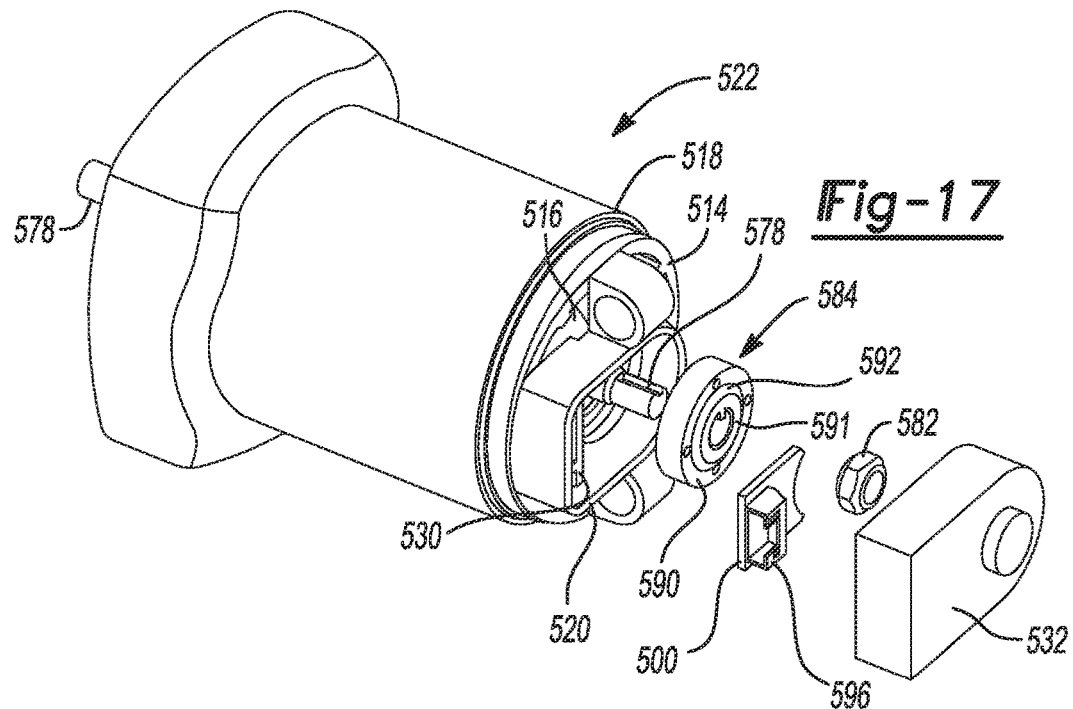
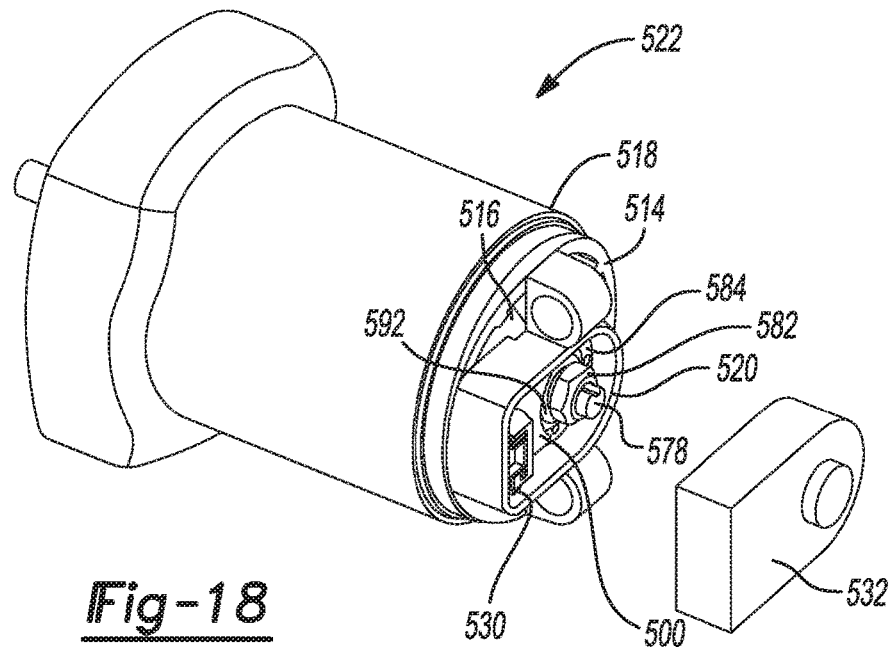

POWER TOOL WITH SEPARATE MOTOR CASE COMPARTMENT

CROSS-REFERENCE TO RELATED APPLICATIONS

This application claims the benefit of U.S. Provisional Application Nos. 62/241,385 filed on Oct. 14, 2015, and 62/249,528 filed on Nov. 2, 2015, and 62/322,462 filed on Apr. 14, 2016. The entire disclosures of the above applications are incorporated herein by reference.

FIELD

The present disclosure relates to various features of a handheld grinder or similar power tool having a brushless electric motor.

BACKGROUND

Some power tools include brushless electric motors. Power tools with brushless electric motors are used for woodworking and metalworking, for example. The environments that power tools are used in contain various contaminants (e.g., dust, debris, fluids). These contaminants compromise various components of the power tool, which undesirably impacts the function, durability, and reliability of the power tool.

Additionally, most power tools include several circuit boards that reside inside a housing of the power tool. The circuit boards are used to support the capacitor, the power switch and circuitry that is used for controlling the brushless motor. These components undesirably increase the heat generation of the power tool during the operation thereof.

Therefore, there is a need for a power tool that protects components from contamination in such working environments while generating less heat, thereby improving the function, durability, and reliability of the power tool.

This section provides background information related to the present disclosure and is not necessarily prior art.

SUMMARY

This section provides a general summary of the disclosure, and is not a comprehensive disclosure of its full scope or all of its features.

In one form, a handheld grinder includes an elongated housing, an electric motor, an output shaft, a wall, a planar circuit board, and a motor drive circuit. The elongated housing defines a cavity therein that includes a motor case disposed at a front end thereof and a handle portion extending axially along a longitudinal axis of the housing from the motor case to a rear end of the housing. The electric motor has a drive shaft and is mounted within the motor case. The output shaft is drivably coupled to the drive shaft of the electric motor and extends perpendicular to the drive shaft. The wall separates the cavity between the motor case and the handle portion of the housing and is configured to support a rear bearing for the drive shaft of the electric motor and includes one or more holes which permit air flow between the motor case and the handle portion of the housing. The planar circuit board is disposed in the handle portion of the housing and extends axially along the longitudinal axis of the housing. The planar circuit board divides the handle portion into an upper section and a lower section. The motor drive circuit is accommodated entirely within the handle portion of the housing on the planar circuit board and configured to deliver a direct current from a DC power bus to the electric motor. The motor drive circuit includes a link capacitor and an auxiliary capacitor. The link capacitor is mounted on the planar circuit board and is coupled across the DC power bus. The auxiliary capacitor has a capacitance more than the capacitance of the link capacitor and is electrically coupled across the DC power bus. The auxiliary capacitor is mounted in the lower section of the handle portion and at the rear end of the handle portion of the housing.

In some configurations, the wall includes a pocket defining an open end and a closed end, wherein the open end of the pocket faces front end of the housing and is sized to receive the rear bearing.

In some configurations, the handheld grinder includes one or more sense magnets affixed to the drive shaft, where the one or more sense magnets are arranged along the drive shaft in between the rear bearing and the closed end of the pocket.

In some configurations, the handheld grinder includes one or more position sensors mounted to a position sense board, where the position sensors cooperate with the one or more sense magnets to sense rotational motion of the drive shaft. A slot is formed in the pocket and configured to receive the position sense board therein such that the position sense board is arranged adjacent to the one or more sense magnets.

In some configurations, the slot in the pocket is overmolded and thereby fluidly seals the position sense board in the pocket.

In some configurations, the motor drive circuit further includes a rectifier, a switching arrangement, an auxiliary switch path, and a switch control circuit. The rectifier is configured to receive an alternating current from an alternating current (AC) power source and operable to convert the alternating current to a direct current supplied to the DC power bus. The switching arrangement has a plurality of motor switches connected electrically between the rectifier and the electric motor, and operates to deliver the direct current from the rectifier to the electric motor. The auxiliary switch path is electrically coupled in parallel with the rectifier and electrically connected between the rectifier and the switching arrangement. The auxiliary switch path includes a switch in series with the auxiliary capacitor. The switch control circuit is configured to detect voltage of the DC power bus and to control state of the switch in accordance with magnitude of the detected voltage, such that state of the switch creates either a charging path for the auxiliary capacitor or a discharging path for the auxiliary capacitor.

In some configurations, the handheld grinder includes a power module support structure disposed in the handle portion of the housing and extending axially along the longitudinal axis of the housing. The circuit board includes a top board segment integrally interconnected by a hinge section to a bottom board segment, such that the top board segment is folded over top of the bottom board segment and the top board segment is affixed to a top surface of the power module support structure and the bottom board segment is affixed to a bottom surface of the power module support structure.

In some configurations, the plurality of motor switches are mounted along two lateral side surfaces of the power module support structure and further includes a heat sink mounted to each of the two lateral side surfaces of the power module support structure, such that the heat sink is adjacent and thermally coupled to the plurality of motor switches.

In some configurations, a speed dial is mounted to the top board segment of the circuit board and operable to set rotational speed of the electric motor.

In some configurations, a support member protruding outwardly from the housing at the rear end thereof.

In some configurations, the support member includes openings extending therethrough to allow air to enter into the cavity.

In yet another form, the power tool includes a housing, an electric motor, and a motor drive circuit. The housing defines a cavity therein, where the cavity is divided into a motor case and a handle portion extending axially along a longitudinal axis from the motor case towards an axial end. The electric motor has a drive shaft and mounted within the motor case. The motor drive circuit is accommodated entirely within the handle portion of the housing and configured to drive the electric motor. The motor drive circuit includes a rectifier, a switching arrangement, a link capacitor and an auxiliary capacitor. The rectifier is configured to receive an alternating current from an alternating current (AC) power source and operable to convert the alternating current to a direct current supplied to a DC power bus. The switching arrangement has a plurality of motor switches connected electrically between the rectifier and the electric motor, and operates to deliver the direct current from the rectifier to electric motor. The link capacitor is electrically coupled in parallel with the rectifier and electrically connected between the rectifier and the switching arrangement. The auxiliary switch path is electrically coupled in parallel with the rectifier and electrically connected between the rectifier and the switching arrangement. The auxiliary switch path includes an auxiliary capacitor in series with a switch, such that the capacitance of the auxiliary capacitor is more than capacitance of the link capacitor and the auxiliary capacitor is disposed at the axial end of the handle portion of the housing.

In some configurations, the motor drive circuit further includes a switch control circuit configured to detect voltage of the DC power bus and to control the state of the switch in accordance with magnitude of the detected voltage, such that state of the switch creates either a charging path for the auxiliary capacitor or a discharging path for the auxiliary capacitor.

In some configurations, a wall separates the cavity between the motor case and the handle portion of the housing, wherein the wall is configured to support a rear bearing for the drive shaft of the electric motor and includes one or more holes which permit air flow between the motor case and the handle portion of the housing.

In some configurations, the wall includes a pocket defining an open end and a closed end, wherein the open end of the pocket faces front end of the housing and is sized to receive the rear bearing.

In some configurations, one or more sense magnets are affixed to the drive shaft, where the one or more sense magnets are arranged along the drive shaft in between the rear bearing and the closed end of the pocket.

In some configurations, one or more position sensors are mounted to a position sense board, where the position sensors cooperate with the one or more sense magnets to sense rotational motion of the drive shaft. A slot is formed in the pocket and configured to receive the position sense board therein, such that the position sense board is arranged adjacent to the one or more sense magnets.

In some configurations, the slot in the pocket is overmolded and thereby fluidly seals the position sense board in the pocket.

In some configurations, the power tool further comprises a power module support structure and a circuit board. The power module support structure is disposed in the handle portion of the housing and extending axially along the longitudinal axis of the housing, thereby dividing the handle portion into an upper section and a lower section. The circuit board is mounted to the power module support structure and has a top board segment integrally interconnected by a hinge section to a bottom board segment, where the top board segment is folded over top of the bottom board segment and the top board segment is affixed to a top surface of the power module support structure and the bottom board segment is affixed to a bottom surface of the power module support structure.

In some configurations, the plurality of motor switches are mounted along two lateral side surfaces of the power module support structure and further includes a heat sink mounted to each of the two lateral side surfaces of the power module support structure, such that the heat sink is adjacent and thermally coupled to the plurality of motor switches.

In yet another form, a power tool includes a housing, an electric motor, a partition, a rear bearing for the drive shaft, and one or more sense magnets. The housing defines a cavity therein and includes a motor case portion and a non-motor case portion. The electric motor has a drive shaft and mounted within the motor case portion of the housing. The motor drive circuit is accommodated within the non-motor case portion of the housing and configured to drive the electric motor. The partition separating the motor case portion from the non-motor case portion of the housing is in the form of a pocket with an open end facing the motor case portion. The rear bearing is disposed into the open end of the pocket and supported by an inner surface of the pocket. The one or more sense magnets is affixed to the drive shaft, where the one or more sense magnets are arranged along the drive shaft in between the rear bearing and a closed end of the pocket.

In some configurations, the power tool includes one or more position sensors mounted to a position sense board, where the position sensors cooperate with the one or more sense magnets to sense rotational motion of the drive shaft. A slot is formed in the pocket and configured to radially receive the position sense board therein, such that the position sense board is arranged adjacent to the one or more sense magnets inside the pocket.

In some configurations, the power tool includes a sense signal wires secured to the position sense board. The wires have a mounting area outside the slot.

In some configurations, the overmold is outside of the pocket to cover the mounting area of the sense signal wires.

In some configurations, the position sense board includes an aperture to partially receive the shaft therein.

In some configurations, the motor drive circuit further includes a switch control circuit configured to detect voltage of the DC power bus and to control a state of the switch in accordance with magnitude of the detected voltage, such that state of the switch creates either a charging path for the auxiliary capacitor or a discharging path for the auxiliary capacitor.

In yet another form, a handheld grinder includes an elongated housing, an electric motor, an output shaft, a wall, one or more position sense magnets, and a motor drive circuit. The housing defines a cavity therein, where the housing includes a motor case disposed at a front end thereof and a handle portion extending axially along a longitudinal axis of the housing from the motor case to a rear end of the housing. The electric motor has a drive shaft and mounted within the motor case, wherein one or more sense magnets are affixed to the drive shaft. The output shaft is drivably coupled to the drive shaft of the electric motor and extends perpendicular to the drive shaft. The wall separates the cavity between the motor case and the handle portion of the housing, wherein the wall is in form of a pocket with an open end facing the motor case portion and the pocket is sized to receive the electric motor. The one or more position sensors mounted to a position sense board, wherein the position sense board is positioned into a slot formed in the pocket and overmolded to thereby fluidly seal the position sense board in the pocket, such that the one or more position sensors are adjacent to the one or more sense magnets and cooperate with the one or more sense magnets to sense rotational motion of the drive shaft. The motor drive circuit is accommodated within the handle portion of the housing and is configured to deliver a direct current from a DC power bus to the electric motor.

In yet another form, the handheld grinder includes a an elongated housing, an electric motor, an output shaft, a power module support, a circuit board, and a motor drive circuit. The housing defines a cavity therein, where the housing includes a motor case disposed at a front end thereof and a handle portion extending axially along a longitudinal axis of the housing from the motor case to a rear end of the housing. The electric motor has a drive shaft and mounted within the motor case. The output shaft is drivably coupled to the drive shaft of the electric motor and extends perpendicular to the drive shaft. The power module support structure is disposed in the handle portion of the housing and extending axially along the longitudinal axis of the housing, where the power module support structure divides the handle portion into an upper section and a lower section. The circuit board is mounted to the power module support structure. The circuit board has a top board segment integrally interconnected by a hinge section to a bottom board segment, where the top board segment is folded over top of the bottom board segment and the top board segment is affixed to a top surface of the power module support structure and the bottom board segment is affixed to a bottom surface of the power module support structure. The motor drive circuit supported on the circuit board and is configured to deliver a direct current from a DC power bus to the electric motor.

In some configurations, the handheld grinder includes a heat sink mounted to each of the two lateral side surfaces of the power module support structure, such that the heat sink is adjacent and thermally coupled to the plurality of motor switches.

In some configurations, the motor drive circuit includes a link capacitor coupled across the DC power bus and mounted on the top board segment of the circuit board, and an auxiliary capacitor having a capacitance greater than the capacitance of the link capacitor and electrically coupled across the DC power bus, such that the auxiliary capacitor is mounted to the bottom board segment of the circuit board.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B are side views of the handheld grinder with a bottom handle cover attached and removed, respectively;

FIG. 14 is a perspective exploded view of an alternative embodiment of a motor case for use in the handheld grinder;

FIGS. 15A and 15B are partial perspective views of the alternative embodiment of the motor case in exploded and assembled form, respectively;

FIG. 16 is a partial perspective view of another alternative embodiment of a motor case in assembled form;

FIG. 17 is a perspective exploded view of yet another alternative embodiment of a motor case for use in the handheld grinder;

FIG. 18 is a perspective assembled view of the motor case in FIG. 17 with enclosure member removed;

Corresponding reference numerals indicate corresponding parts throughout the several views of the drawings.

DETAILED DESCRIPTION

Example embodiments will now be described more fully with reference to the accompanying drawings.

Figure 1:
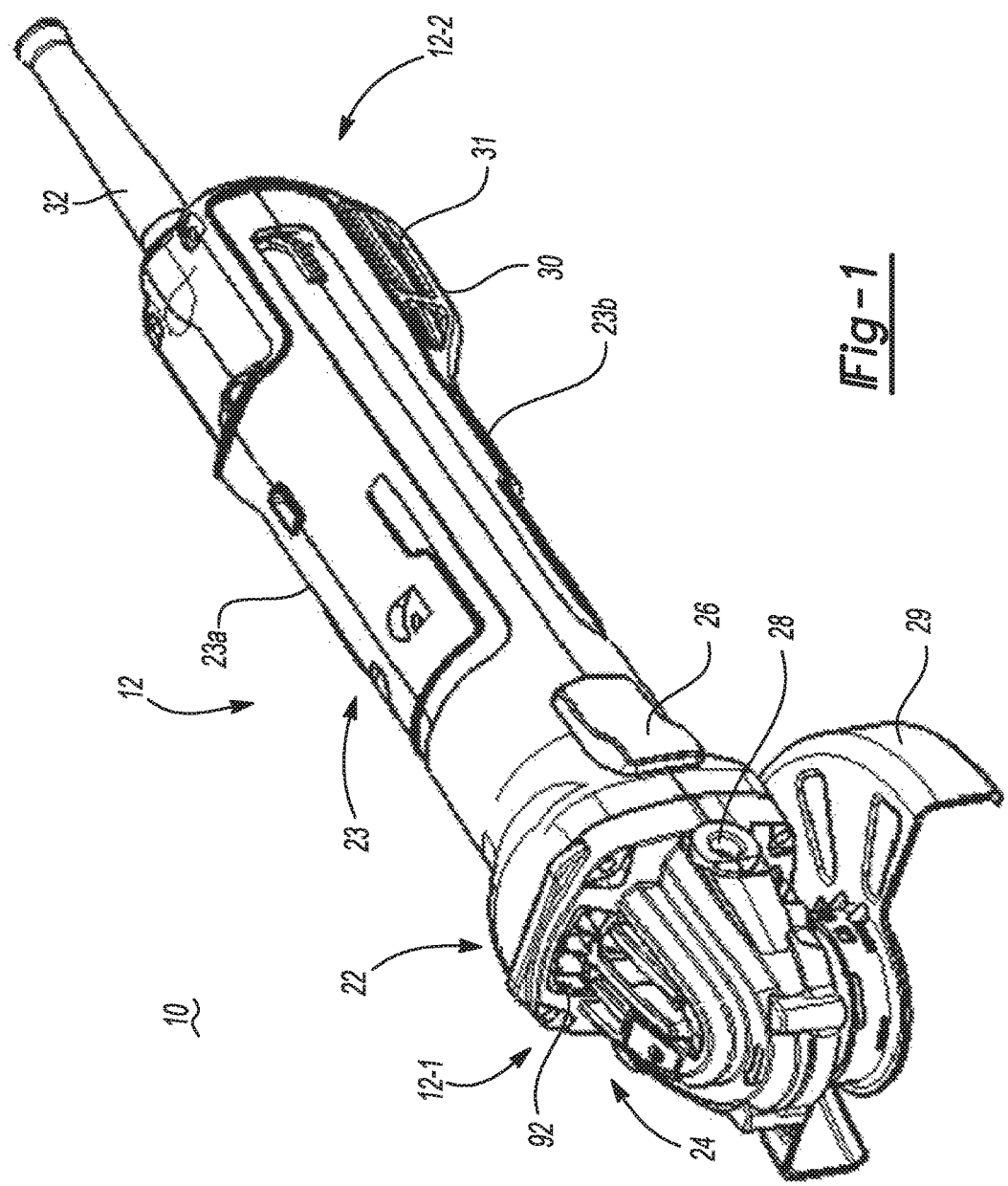
FIG. 1 is a perspective view of a handheld grinder.
Figure 3:
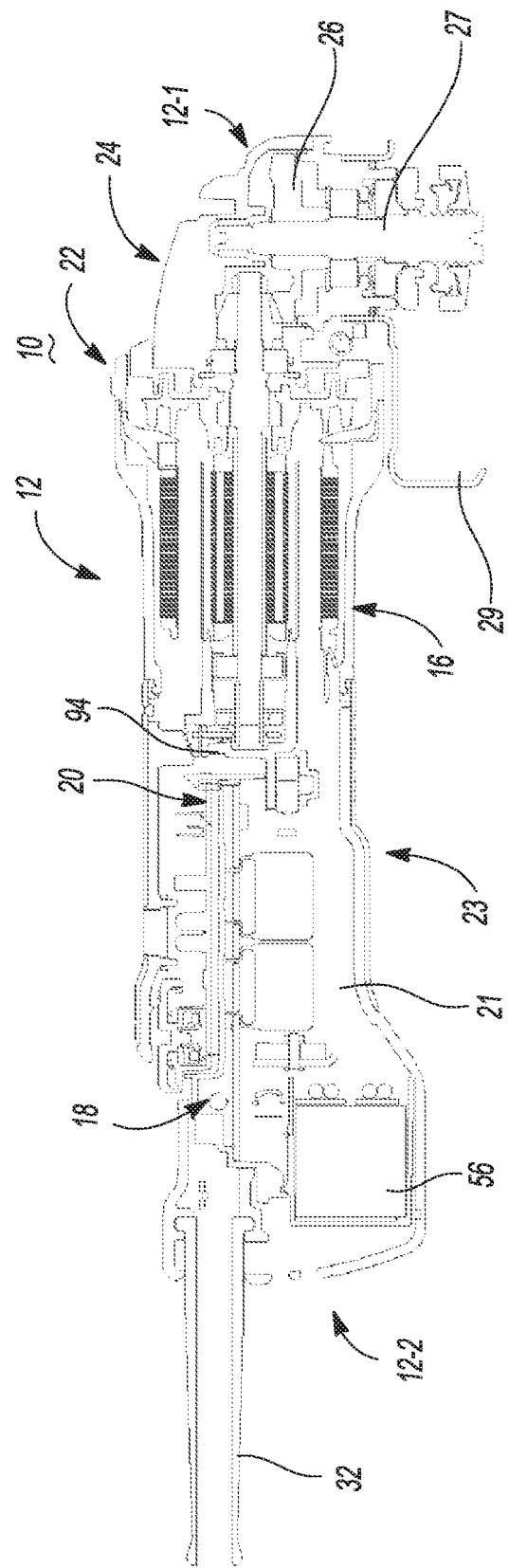
FIG. 3 is a cross-sectional side view of an example embodiment of the handheld grinder.

Referring to FIGS. 1, 2A, 2B, and 3, a power tool 10 is shown. In this example embodiment, the power tool 10 includes an elongated housing 12, a motor 16 (FIG. 3), a module casing or power module support structure 18 (FIG. 3), and a planar circuit board 20 (FIG. 3).

The housing 12 defines a cavity 21 (FIG. 3) and includes a motor case 22 and a handle portion 23. The motor case 22 is positioned at one end 12-1 of the housing 12 and includes a gear case 24 and a power switch 26. The gear case 24 includes a gearset 26, an output shaft 27, and a threaded opening 28. The gearset 26 is positioned within the gear case 24 and is drivably coupled to the motor 16. The output shaft 27 is drivably connected to the gearset 26 within the gear case 24 and extends perpendicular to the longitudinal axis of the housing 12. The output shaft 27 is also coupled to a grinding or a cutting disc (not shown) via a flange (not shown). The grinding disk may be removed and replaced with a new grinding disk. For example, a user of the power tool 10 may replace the existing grinding disk with a new grinding disk after the existing disk wears out. An adjustable guard 29 may cover at least a portion of the rotating disk to obstruct sparks and debris generated during operation of the power tool 10. The threaded opening 28 allows for selectively attaching a side-handle (not shown) to enable two-handed operation. The power switch 26 is positioned on a side of the motor case 22 and allows for the user to turn the power tool 10 ON and OFF.

The handle portion 23 extends axially from the motor case 22 toward a second end 12-2 of the housing 12 and includes a first cover 23a and a second cover 23b. The first and the second covers 23a, 23b are secured together around the module casing 18 and the planar circuit board 20 disposed within the cavity 21 of the handle portion 23. The second cover 23b includes a support member 30 protruding outwardly therefrom and positioned at the second end 12-2 of the housing 12. The support member 30 includes openings 31 extending therethrough to allow incoming air to enter the cavity 21. An AC power cord 32 is attached to the handle portion 23 at the second end 12-2 of the housing 12 to supply electric power to the power tool 10.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw bit, thereby allowing the power tool 10 to be used as a power drill or a power screw driver.

Figure 4A:
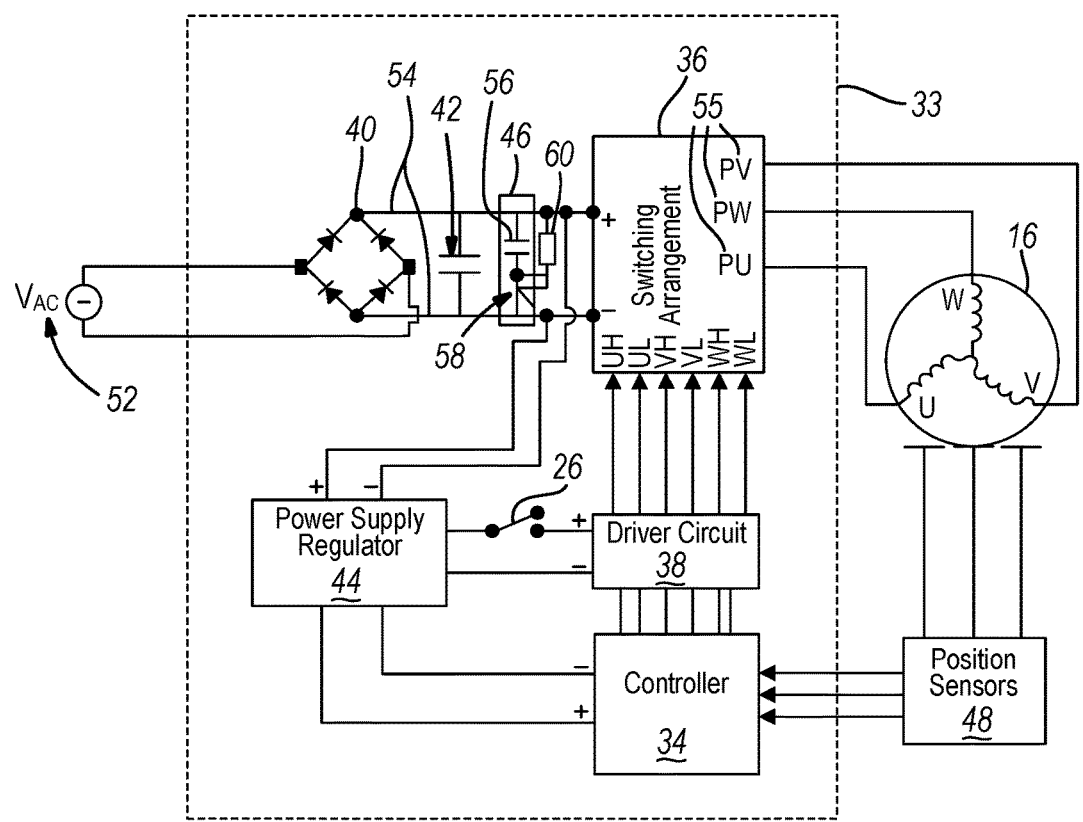
FIGS. 4A and 4B are schematics of an example motor control system for the handheld grinder.

FIG. 4A depicts a schematic that illustrates an example of a motor drive circuit 33. Many components included in the motor drive circuit 33 may be integrated on the planar circuit board 20 disposed entirely within the cavity 21 of the handle portion 23. The motor drive circuit 33 is comprised generally of a controller 34, a switching arrangement 36, a driver circuit 38, a rectifier 40, a DC bus capacitor 42, a power supply 44, and an auxiliary switch path 46. The motor drive circuit 33 may further include positioned sensors 48, such as Hall Effect sensors that are configured to detect rotational motion of the motor 16 and generate a signal indicative of the rotational motion. The signal may have a periodic waveform whose magnitude may vary in accordance with the rotational position of the motor 16. It should be noted, that other types of positional sensors may be alternatively utilized and should not be limited to Hall Effect sensors.

An AC supply 52 delivers an alternating current to the rectifier 40 through, for example, the power cord 32. The rectifier 40 converts the alternating current into a direct current that is outputted to a DC bus 54 (i.e., power line/bus). The output of the rectifier 40 may be pulsating DC signal and not a pure DC signal.

The DC bus capacitor 42 is electrically connected in parallel with the rectifier 40. The switching arrangement 36 is electrically connected with the DC bus capacitor 42 and may receive the pure DC signal or the substantially pure DC signal from the DC bus capacitor 42 via the DC bus 54. The switching arrangement 36 includes a plurality of motor switches 55 that, when switched on, deliver the DC current to the motor 16. The motor switches 55 may be IGBTs or FETs, for example. The switching arrangement 36 may be further defined as a three-phase inverter bridge although other arrangements are contemplated by this disclosure.

The driver circuit 38 interfaces with the motor switches 55 of the switching arrangement 36. The driver circuit 38 controls the state of the motor switches 55. In the example embodiment, the driver circuit 38 is shown as being separate from the switching arrangement 36. Alternatively, the driver circuit 38 and the switching arrangement 36 may be a single integrated circuit which may be commercially available from various manufacturers. For example, the switching arrangement 36, which may include IGBTs, and the driver circuit 38 may be a part of an integrated power module.

The controller 34 interfaces with the driver circuit 38 and may generate PWM signals to control the motor 16. In this embodiment, the controller 34 receives power from the power supply regulator 44. In an alternate embodiment, the controller 34 may receive power directly from the rectifier 40.

The power supply regulator 44 is electrically connected in parallel with the rectifier 40 and operates to power the driver circuit 38 via the power on/off switch 26. The power on/off switch 26 is positioned between the power supply regulator 44 and the driver circuit 38.

When the power on/off switch 26 is switched to the ON-position, the driver circuit 38 receives power from the power supply regulator 44. When the driver circuit 38 receives power, the driver circuit 38 is able to control the state of the motor switches 55 and the motor 16 is on.

Conversely, when the power on/off switch 26 is switched to the OFF-position, the driver circuit 38 does not receive power from the power supply regulator 44. When the driver circuit 38 does not receive power, the driver circuit 38 is not able to control the state of the motor switches 55 and the electric motor is off.

As illustrated, the power on/off switch 26 is electrically connected between the rectifier 40 and the driver circuit 38. The power on/off switch 26 is positioned such that the power from the AC power supply 52 does not pass through the power on/off switch 26. Furthermore, the current being drawn by the motor 16 does not pass through the power on/off switch 26. The current passing through the power on/off switch 26 is the current being drawn by the driver circuit 38 and the current being drawn by the driver circuit 38 is lower than the current being drawn by the electric motor 16.

The DC bus capacitor 42 may be a link capacitor having relatively small capacitance and does not act to smoothen the full-wave rectified AC voltage. The DC bus capacitor 42 is a bypass capacitor that removes the high frequency noise from the bus voltage.

The auxiliary switch path 46 is electrically coupled in parallel with the rectifier 40 and the link capacitor 42, and is electrically connected between the rectifier 40 and the switching arrangement 36. The auxiliary switch path 46 includes an auxiliary capacitor 56 and a switch 58 positioned in series with the auxiliary capacitor 56.

The switch 58 may be a controlled switch, such as a MOSFET or an IGBT, in an embodiment. The switch 58 may be controlled by software programmed into the controller 34 or another programmable microcontroller. Alternatively, the switch 58 may be controlled by hardware, such as a switch control circuit 60, described in detail below.

When the switch 58 is closed, the auxiliary capacitor 56 is connected parallel to the DC bus capacitor 42.

Figure 4B:
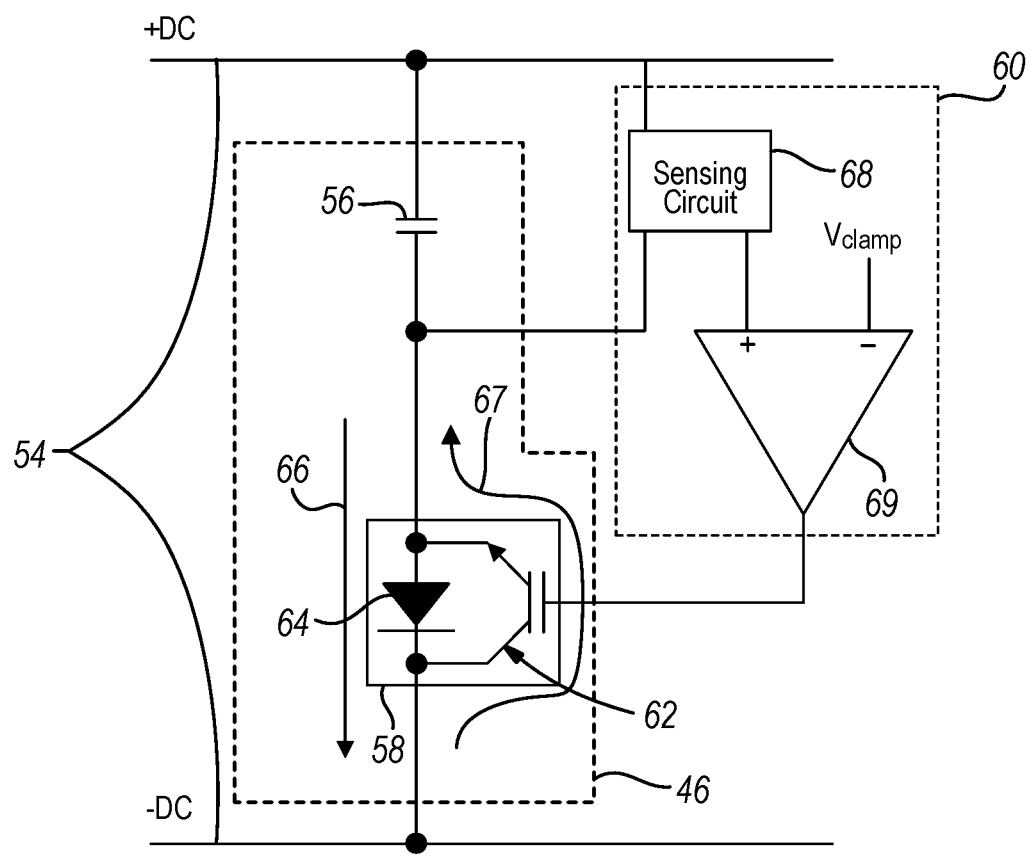

FIG. 4B depicts an example embodiment of the auxiliary switch path 46 and the switch control circuit 60. The switch control circuit 60 selectively activates or deactivates the auxiliary capacitor 56. The switch 58 is provided as a transistor 62, such as an insulated-gate bipolar transistor (IGBT) that has an anti-parallel diode 64. The diode 64 is configured to form a charge path (i.e., a first path) indicated by arrow 66 and the IGBT 62 is configured to form a discharge path (i.e., second path) indicated by arrow 67. The switch 58 controls the flow of current through the auxiliary capacitor 56 via the charge path or the discharge path. It is readily understood that other switching mechanisms may be utilized and that the switch 58 should not be limited to the components described herein.

The switch control circuit 60 includes a sensing circuit 68 and a comparator 69. The sensing circuit 68 senses voltage along the DC bus 54. For example, in the example embodiment, the sensing circuit 68 detects the voltage across the auxiliary capacitor 56. Alternatively, the sensing circuit 68 may alternatively be arranged to sense the voltage difference between the positive and negative nodes of the DC bus 54 (denoted as +DC and −DC herein).

The sensing circuit 68 provides the sensed voltage to the comparator 69, which compares the voltage to a predetermined voltage threshold $V_{clamp}$. If the sensed voltage exceeds the voltage threshold $V_{clamp}$, the comparator 69 output turns ON the transistor 62, which couples the auxiliary capacitor 56 to the DC bus 54 and discharges the auxiliary capacitor 56. More particularly, the IGBT 62 allows current to follow through the discharge path 67 and the auxiliary capacitor 56 discharges built up charge to reduce the bus voltage transients.

When the sensed voltage is lower than the voltage threshold, the IGBT 62 is turned OFF and current flows through the diode 64 via the charge path 66. Specifically, in this embodiment, the auxiliary capacitor 56 is charged by current through the anti-parallel diode 64 during every peak of every half cycle of the bus voltage when the bus voltage exceeds the voltage of the auxiliary capacitor 56. This keeps the auxiliary capacitor 56 in fully charged state. Current to the auxiliary capacitor 56 during normal operation is very nominal and may be determined by the sum of capacitor's internal discharge and the current through the sensing circuit 68. The current is small enough that it does not influence Power-Factor or harmonics of the system.

The voltage threshold for opening and closing the switch 58 (e.g., turning transistor 62 OFF and ON) may be provided as two separate thresholds for creating suitable hysteresis. For example, a first voltage threshold may be designated for having the switch 58 open when the detected voltage is less than the first voltage threshold and a second voltage threshold may be designated for closing the switch 58 when the detected voltage is greater than or equal to the second voltage threshold. The second voltage threshold is greater than the first voltage threshold. An example embodiment of such arrangement is disclosed in PCT Patent Publication No. WO 2016/100891 which published on Jun. 23, 2016 and is incorporated herein by reference in its entirety.

Figure 5:
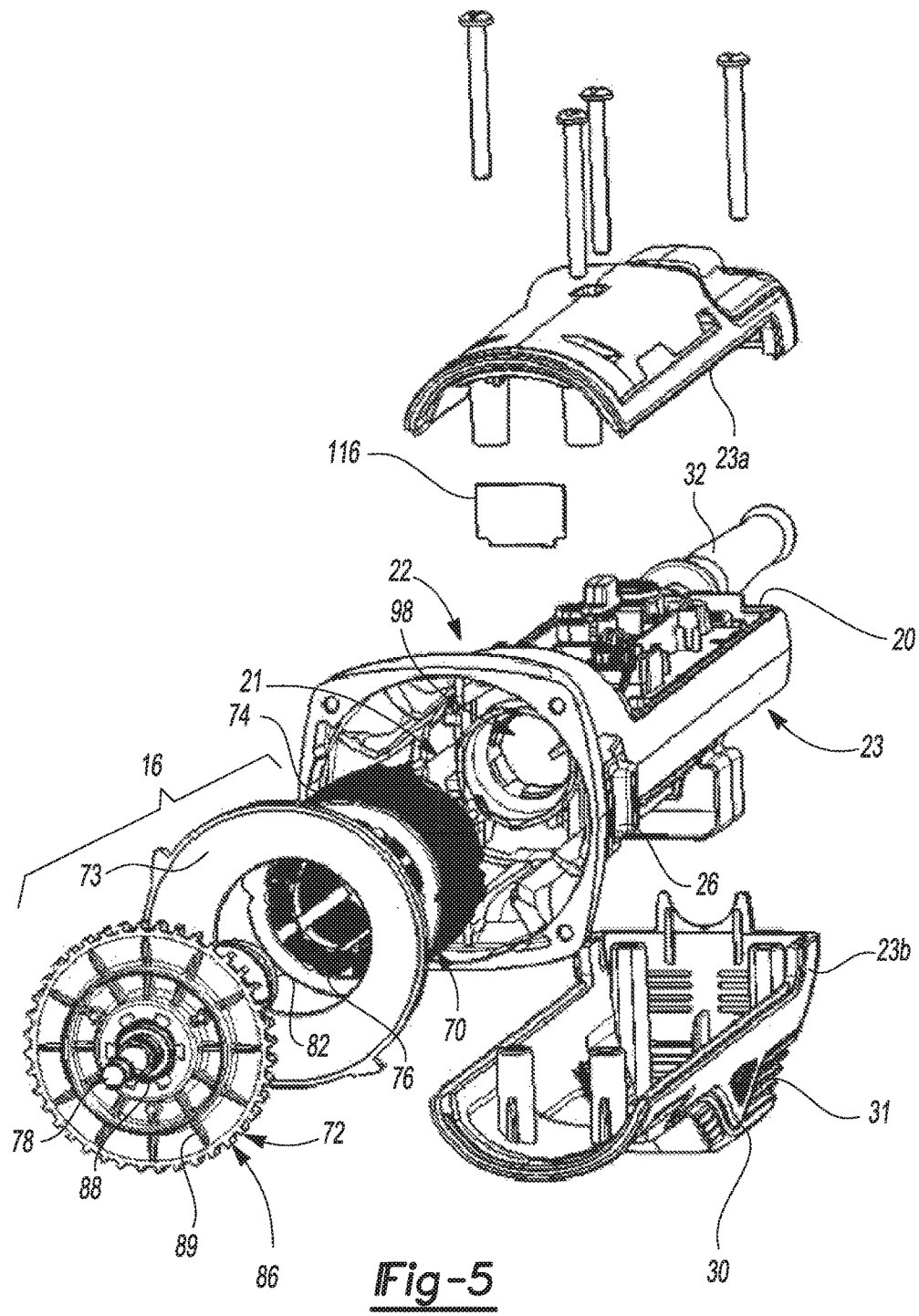
FIG. 5 is a perspective exploded view of the example embodiment of the handheld grinder.
Figure 6:
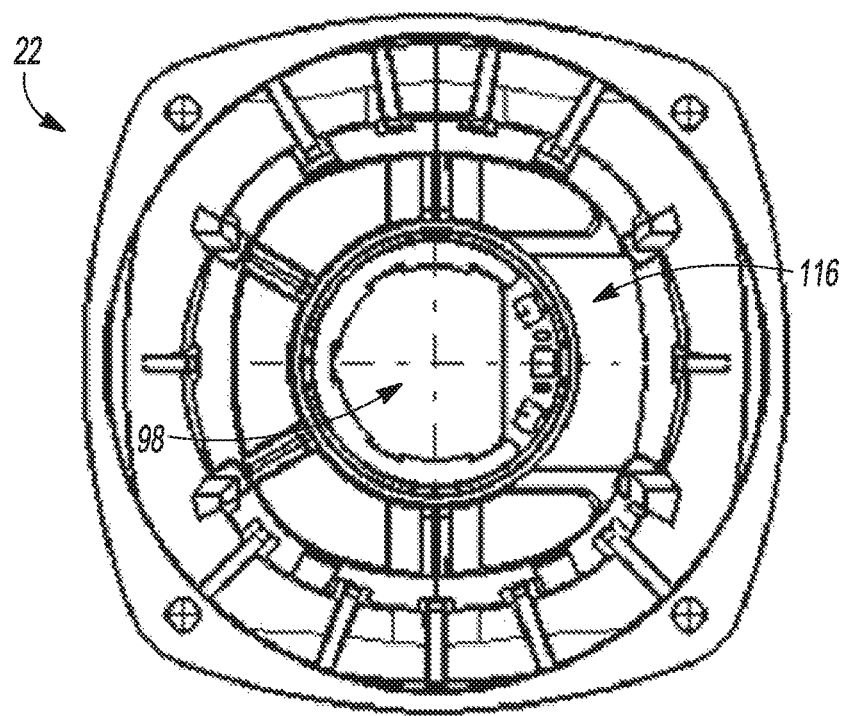
FIG. 6 is an axial view of the motor case in the example embodiment of the grinder without the motor therein.
Figure 7:
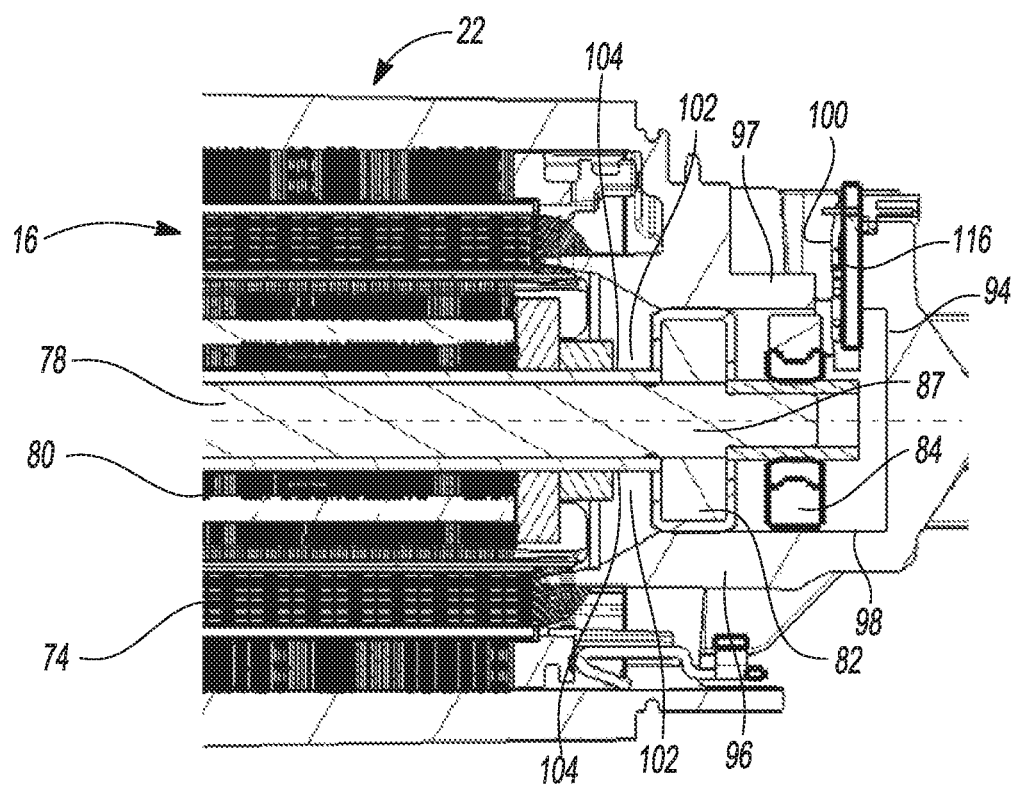
FIG. 7 is a partial cross-sectional view of the motor case in the example embodiment of the handheld grinder.
Figure 8:
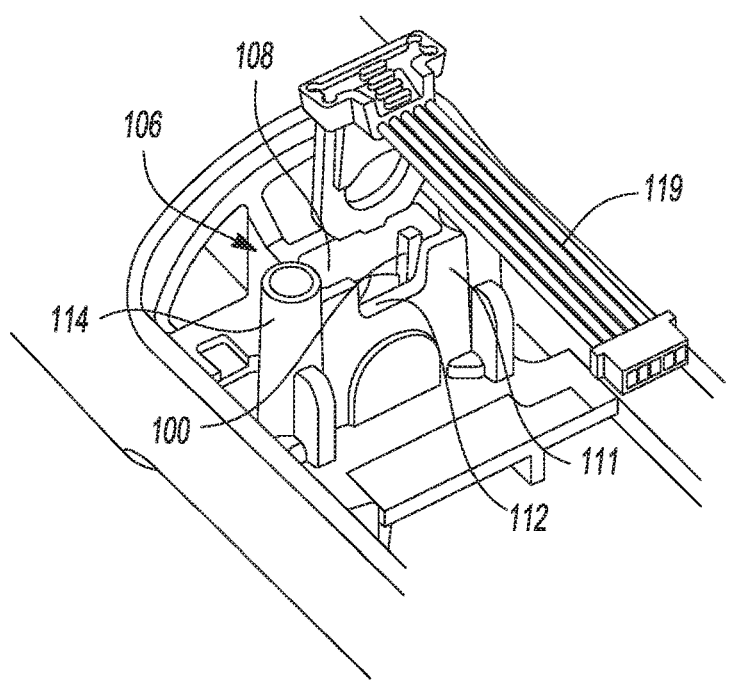
FIG. 8 is a partial perspective view of motor case with slot configured to receive positional sensor board.
Figure 9:
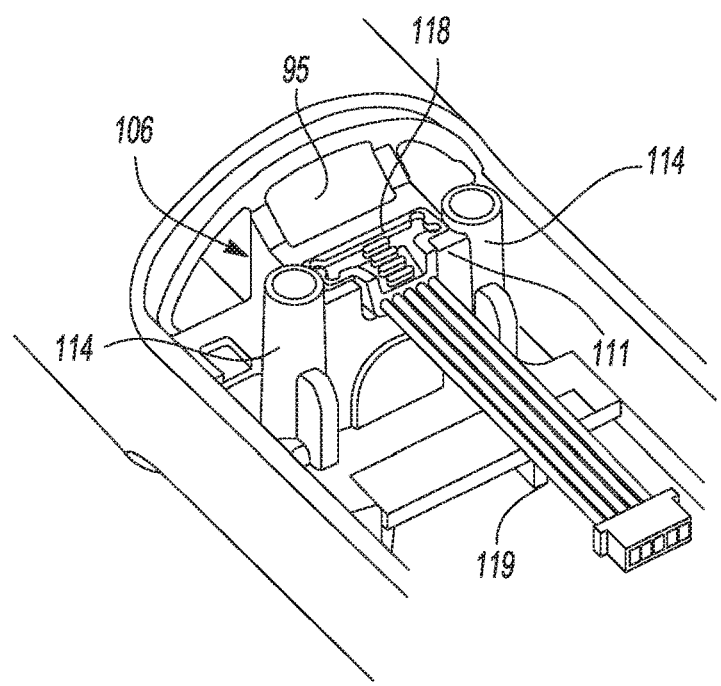
FIG. 9 is a partial perspective view of the motor case with an overmolded positional sensor board.
Figure 10:
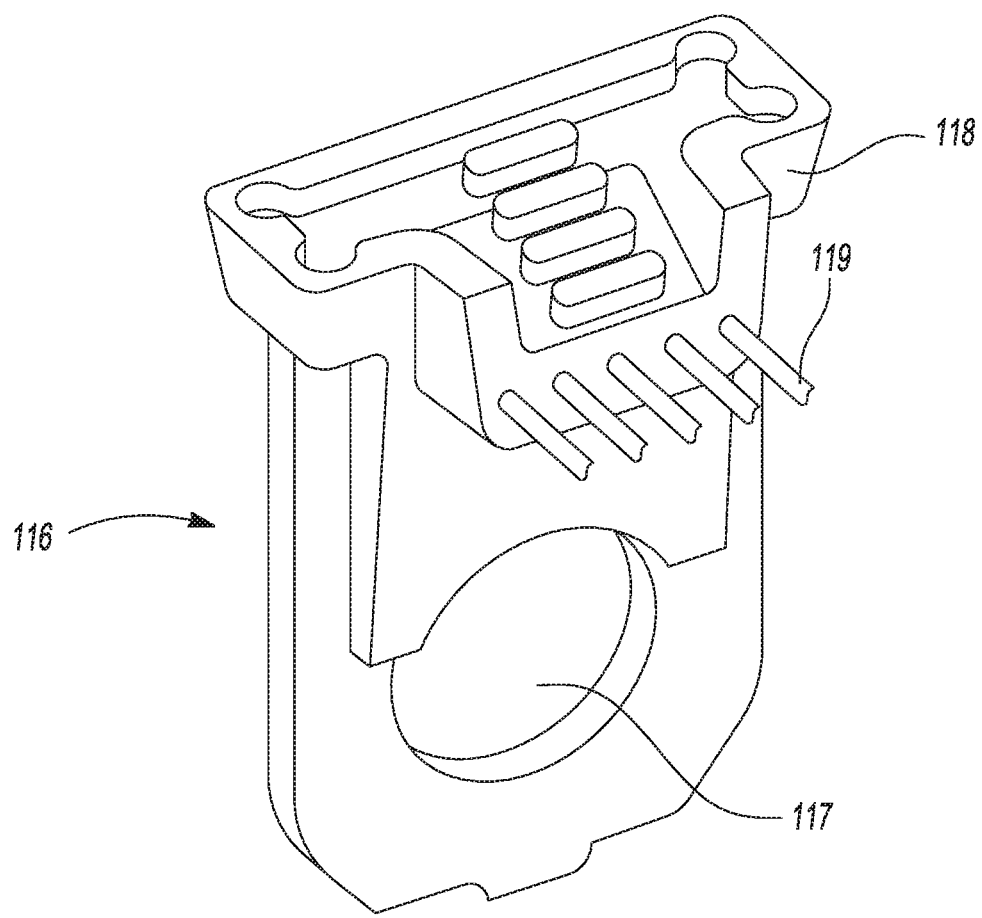
FIG. 10 is a perspective view of the overmolded positional sensor board.
Figure 11:
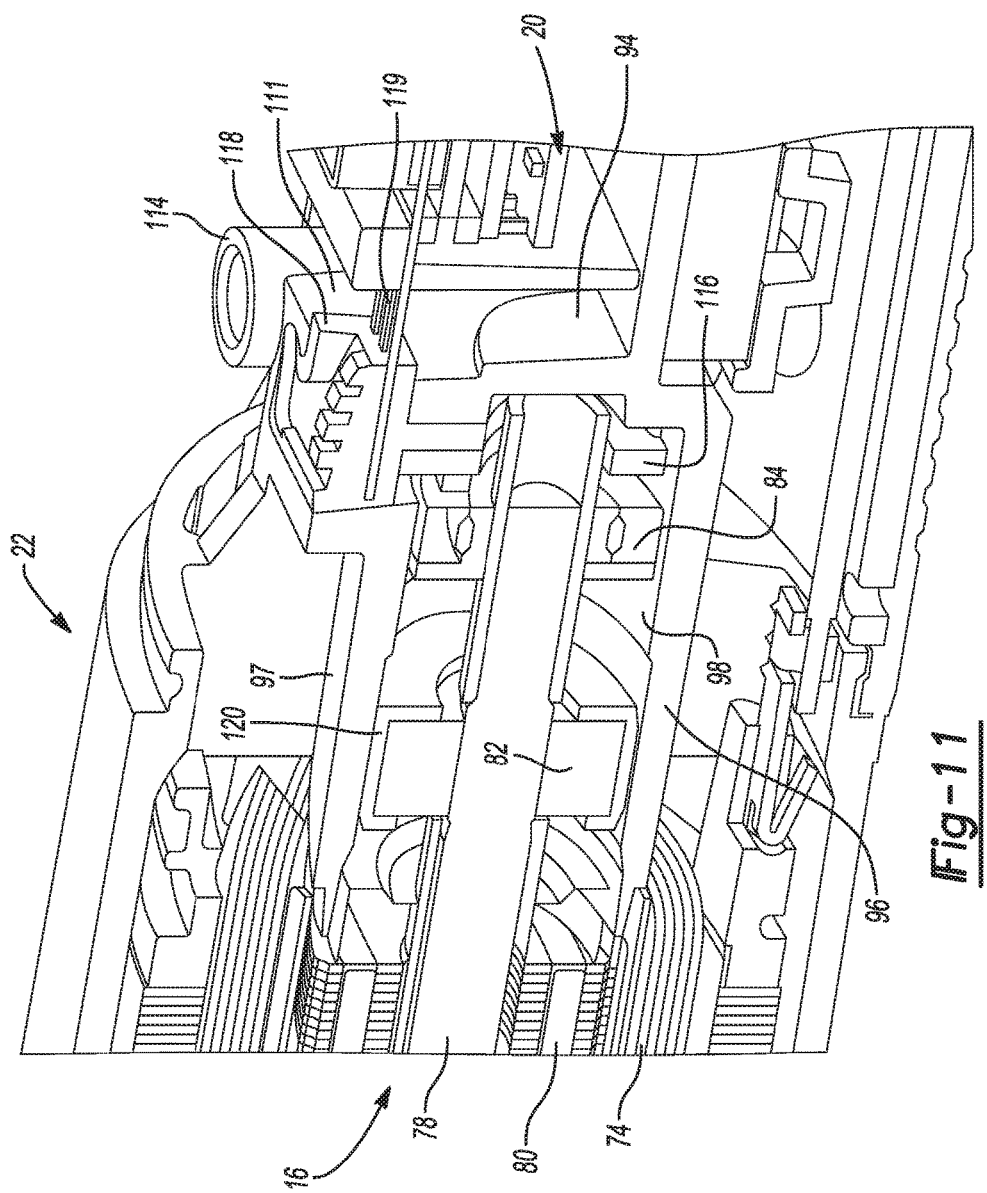
FIG. 11 is a partial perspective cross-sectional view of the motor case with the overmolded positional sensor board.

Referring to FIGS. 5-7, the motor 16 is mounted within the cavity 21 of the motor case 22. The motor 16 is also drivably coupled to the output shaft 27 (FIG. 3) of the gear case 24. The motor 16 is a three-phase brushless DC (BLDC) motor and includes a stator assembly 70, a rotor assembly 72, and a baffle 73 (FIG. 5). The stator assembly 70 includes a cylindrical lamination stack 74 configured to receive a portion of the rotor assembly 72. The cylindrical lamination stack 74 further includes windings 76 wound and connected in either a wye or a delta configuration around the rotor assembly 72 to define the three phases of the motor 16.

The rotor assembly 72 includes a rotor shaft 78, a cylindrical rotor lamination stack 80 (FIG. 7), a rear bearing 82, a sensing magnet 84, and a fan 86 (FIG. 5). The rotor shaft 78 is drivably coupled to the output shaft 27 (FIG. 3) and extends longitudinally through the motor case 22 of the housing 12. The rotor lamination stack 80 is rotatably mounted on the rotor shaft 78. The rotor lamination stack 80 may include a series of flat laminations (not shown) attached together via an interlock (e.g., snap-fitted, adhesive, overmold) that houses or hold two or more permanent magnets (not shown) therein. The rear bearing 82 is mounted on a rear end 87 of the rotor shaft 78 to support the shaft 78 within the power tool 10. The sensing magnet 84 is rotatably mounted on the rear end 87 of the rotor shaft 78 behind the rear bearing 82.

The fan 86 is rotatably mounted on a front end 88 of the rotor shaft 78. The fan 86 of the rotor assembly 72 includes blades 89 that rotate with the shaft 78 to facilitate the incoming air entering the openings 31 to flow through the motor 16. The baffle 73 disposed between the stator assembly 70 and the fan 86 guides the air flowing through the housing 12 towards exhaust vents 92 (FIG. 1) of the gear case 24.

With reference to FIG. 7, a partition member or wall 94 separates the cavity 21 (FIG. 3) of the housing 12 between the motor case 22 and the handle portion 23. The partition member 94 may be integrally formed with the housing 12 and extend perpendicular relative to the longitudinal axis of the housing 12. The partition member 94 includes at least one aperture 95 at a periphery thereof to permit air flow between the motor case 22 and the handle portion 23. The partition member 94 also includes first and second axial walls 96, 97 extending perpendicular therefrom. The partition member 94 and the first and second walls 96, 97 cooperate to form a cylindrically-shaped pocket 98. The second wall 97 having a radially extending slot 100 (i.e., perpendicular to the longitudinal axis of the rotor shaft 78) that extends therethrough such that the pocket 98 is accessible through the slot 100.

A flange 102 extends perpendicular from terminal ends of the walls 96, 97 toward the rotor shaft 78 to define an opening 104 in the pocket 98. The opening 104 of the pocket faces the gear case 24 (FIG. 1) at the one end 12-1 of the housing 12. Once the motor 16 is mounted within the motor case 22, the pocket 98 receives the rotor shaft 78, the rear bearing 82, and the sensing magnets 84 of the rotor assembly 72. The sensing magnet 84 is disposed at the rear end 87 of the shaft 78 between the rear bearing 82 and the partition member 94. The rear bearing 82 is positioned between the rotor lamination stack 80 and the sensing magnet 84.

Referring to FIGS. 8-11, a substantially rectangular-shaped shroud member 106 defining an opening 108 extends perpendicular from the second wall 97 (FIG. 11) of the pocket 98. The shroud member 106 extends overtop the slot 100. The shroud member 106 is also positioned on the second wall 97 between fastener-receiving apertures 114 of the second cover 23b. A back wall 111 of the shroud member 106 is co-planar with the partition member 94 and defines a U-shaped cut-out 112. It is understood that the shroud member 106 may also be trapezoidal or semi-circular.

23. A substantially rectangular-shaped positional sensor board 116 (FIG. 10) for detecting a rotational position of the rotor assembly 72 includes, a top member 118 and wires 119.

It should be understood that although this example embodiment includes the positional sensor board 116 being substantially rectangular, other shapes (e.g., trapezoidal, or rectangular with a curved surface) are within the scope of the present disclosure. The positional sensor board 116 includes an aperture 117 that partially receives the shaft 78 therein. The top member 118 may be a polymeric material that is attached to the positional sensor board 116 by an overmolding process. The wires 119 carrying positional signals from the sensors of the positional sensor board 116 extend toward the second end 12-2 of the housing 12.

With continued reference to FIGS. 8-11, installation of the sensor board 116 within the slot 100 will be described in detail. The positional sensor board 116 may be radially inserted (i.e., inserted in a direction perpendicular to the rotational axis of the shaft 78) within the slot 100 by the user such that a portion of the board 116 including the sensors extends into the pocket 98 and face the sensing magnet 84. Once fully inserted, the wires 119 are comfortably received in the cut-out 112 of the back wall 111. The top member 118 of the positional sensor board 116 fluidly seals the opening 108 and the cut-out 112 of the shroud member 106 to prevent dust and debris from entering into the opening 124 and damaging the positional sensor board 116 and the sensing magnet 84. Additionally, a sealing member 120 (FIG. 11) is disposed around the rear bearing 82 to sealingly block contamination (e.g., dust, debris, fluids) from reaching and damaging the sensing magnet 84 and the positional sensor board 116 within the pocket 98.

Figure 12:
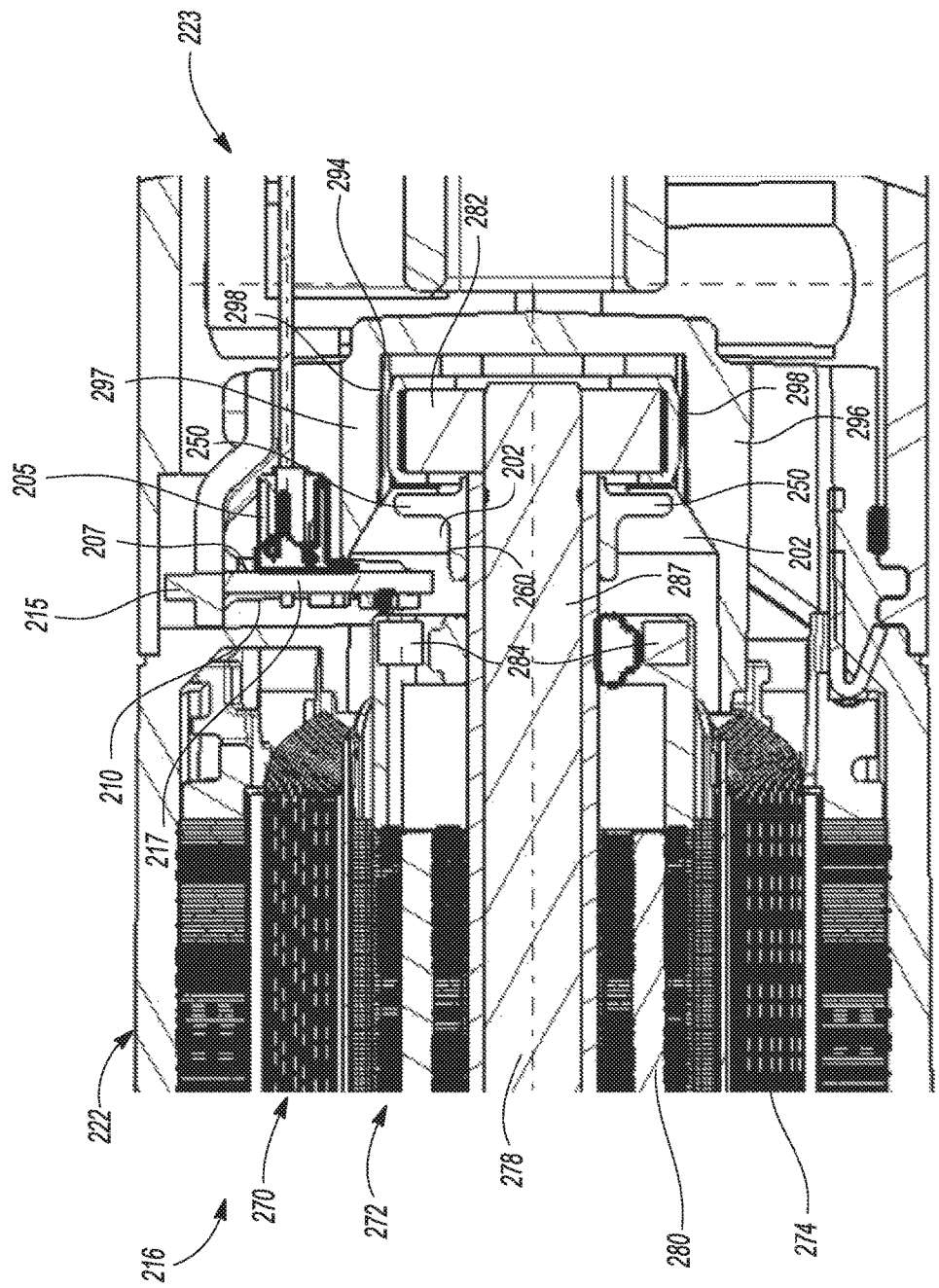
FIG. 12 is a partial cross-sectional view of the motor case in an alternative example embodiment of the handheld grinder.
Figure 13A:
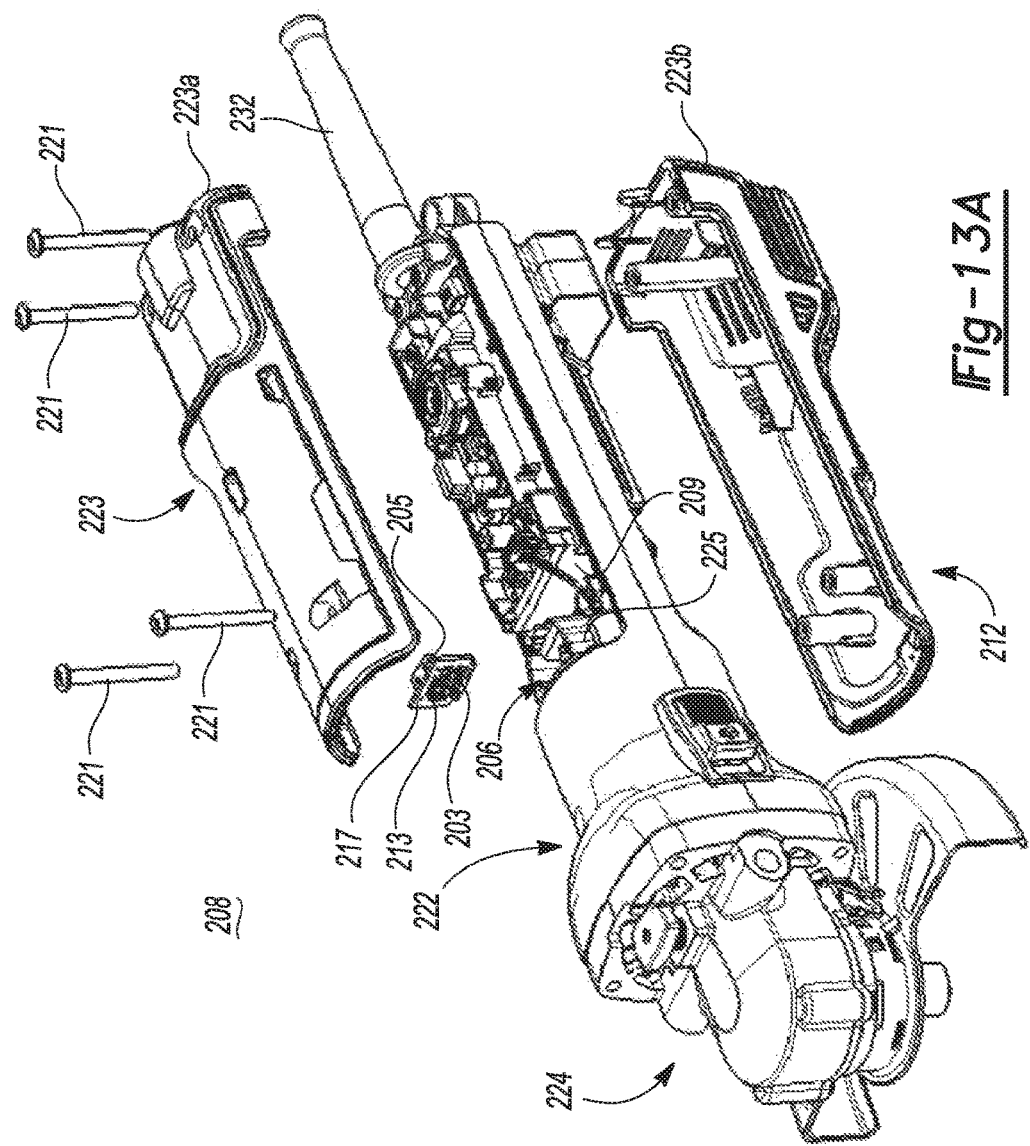
FIGS. 13A and 13B are perspective exploded views of the alternative example embodiment of the handheld grinder.
Figure 13B:
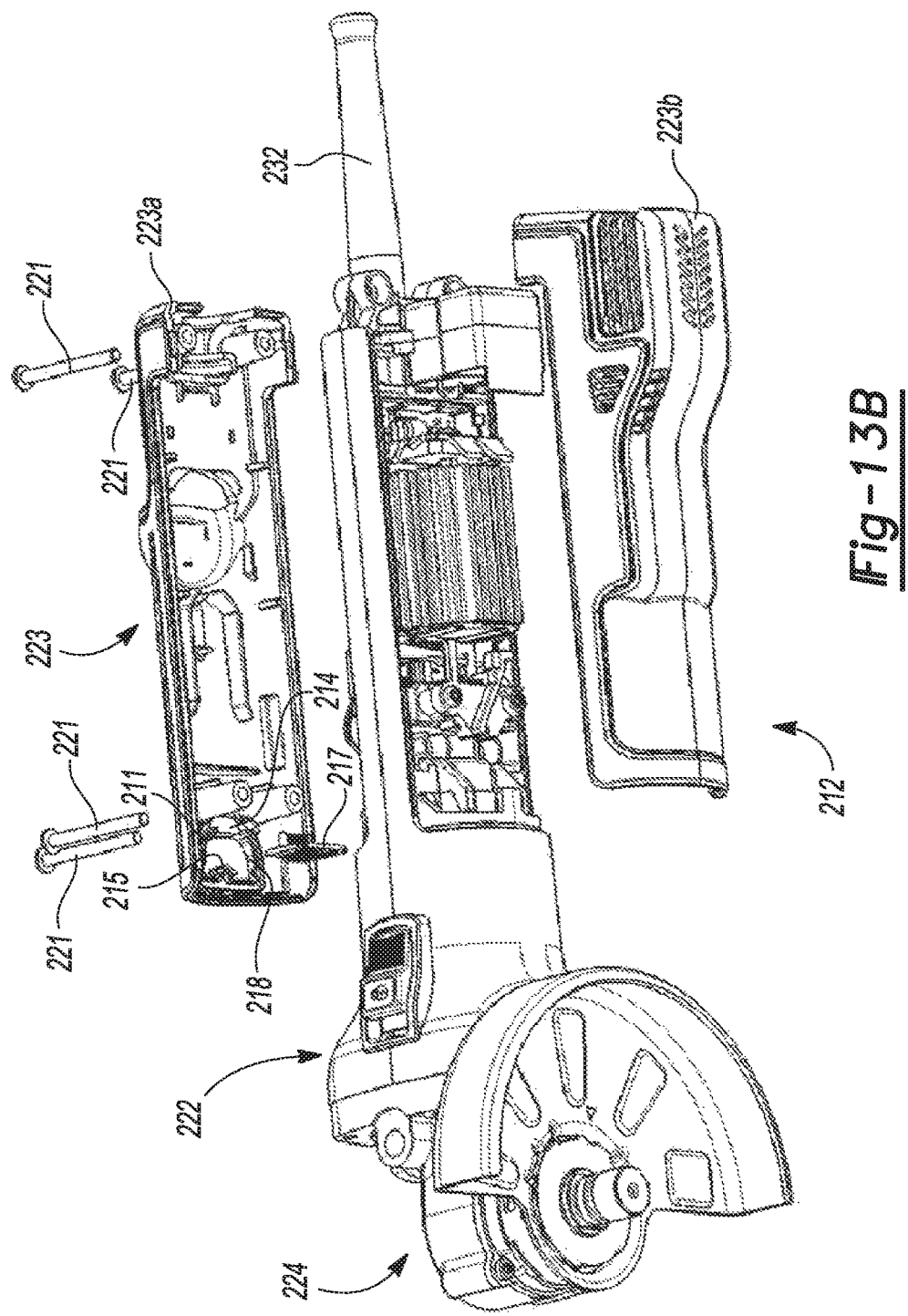

With reference to FIGS. 12, 13A, and 13B another power tool 208 is provided. The structure and function of the housing 212 may be similar to that of the housing 12, apart from any exceptions described below. This embodiment includes an alternate housing 212 having a different sealing technique than the housing 12.

With reference to FIG. 12, a motor 216 is mounted within a motor case 222 in a similar manner described above, apart from any exceptions described below. The motor 216 is drivably coupled to the output shaft (not shown) of the gear case 224. The motor 216 includes a stator assembly 270, a rotor assembly 272, and a baffle (not shown). The stator assembly 270 includes a cylindrical lamination stack 274 configured to receive a portion of the rotor assembly 272.

The rotor assembly 272 includes a rotor shaft 278, a cylindrical rotor lamination stack 280, a rear bearing 282, a sensing magnet 284, and a fan (not shown). The rotor shaft 278 is extends longitudinally through the motor case 222 of the housing 212. The rotor lamination stack 280 is rotatably mounted on the rotor shaft 278. The rotor lamination stack 280 may include a series of flat laminations (not shown) attached together via an interlock (e.g., press fit, adhesive, overmold) that houses or hold two or more permanent magnets (not shown) therein. The rear bearing 282 is mounted on a rear end 287 of the rotor shaft 278 to support the shaft 278 within the power tool 10. The sensing magnet 284 is rotatably mounted on the rear end 287 of the rotor shaft 278 in front of the rear bearing 282.

A partition member or wall 294 separates the cavity (not shown) of the housing 212 between the motor case 222 and a handle portion 223. The partition member 294 may be integrally formed with the housing 212 and extend perpendicular relative to the longitudinal axis of the rotor shaft 278. The partition member 294 includes at least one aperture (not shown) at a periphery thereof to permit air flow between the motor case 222 and the handle portion 223. The partition member 294 also includes first and second axial walls 296, 297 extending perpendicular therefrom. The partition member 294 and the first and second walls 296, 297 cooperate to form a cylindrically-shaped pocket 298. A flange 202 extends perpendicular from terminal ends of the walls 296, 297 toward the rotor shaft 278 to define an opening 260 in the pocket 298.

Once the motor 216 is mounted within the motor case 222, the pocket 298 receives the rotor shaft 278 and the rear bearing 282 of the rotor assembly 272. The partition member 294 supports the rear bearing 282 in the pocket 298. A seal member 250 is positioned between the flange 202 and the shaft 278 in the opening 260. The sensing magnet 284 is disposed adjacent to the pocket 298. The slot 210 is positioned between the pocket 298 and the sensing magnet 284. The sensing magnet 284 is positioned between the slot 210 and the rotor lamination stack 280.

Referring now to FIGS. 13A and 13B, a positional sensor board 217 includes sensors 203 on a first side 213 and a connector 205 extending perpendicular from a second side 207 (FIG. 12). A substantially rectangular-shaped shroud member 206 extends perpendicular from a surface 209 overtop the slot 210.

As shown in 13B, a first cover 223a of the handle portion 23 includes a compartment 211 and a protrusion 215. The compartment 211 has a similar profile as the shroud member 206 overtop the slot 210 and extends perpendicular from a surface 214 of the first cover 223a. The first cover 223a may also define recess channels 218 surrounding the compartment 211. The channels 218 may include a strip of flexible polymeric material (e.g., rubber) disposed therein. The protrusion 215 is positioned within the compartment 211 and projects perpendicularly from the surface 214 of the first cover 223a toward the shroud member 206.

With continued reference to FIGS. 12, 13A, and 13B, installing and fluidly sealing the sensor board 217 within the slot 210 will be described in detail. The user inserts the positional sensor board 217 within the slot 210. The first cover 223a and the second cover 223b are securely fastened to each other via fasteners 221, thereby intimately mating the compartment 211 with the shroud member 206. The protrusion 215 of the first cover 223a abuts (FIG. 13) the positional sensor board 217 to retain the positional sensor board 217 securely within the slot 210. The recess channels 218 receive walls 225 of the shroud member 206 to further prevent contamination (e.g., debris, dust, fluids, etc. . . . ) from entering into the slot 210 and damaging the positional sensor board 217 and the sensing magnet 284. It is understood that during the assembly of the housing 212, the rear bearing 282 is inserted inside the pocket 298 prior to the positional sensor board 217 being inserted into the slot 210, so that the positional sensor board 217 does not interfere with the rear bearing 282 inserted inside the pocket 298.

Referring to FIGS. 14, 15A, and 15B, an alternate embodiment is provided. The structure and function of the motor case 322 may be similar or identical to that of the motor cases 22, 222, apart from any exceptions described below. This embodiment includes an alternate motor case 322 having an alternative sensor board installation and sealing technique than the motor cases 22, 222.

The motor case 322 may house the motor 216 having the structure and function as described above. The motor case 322 may be a separate component that can be threadably attached to handle portion (not shown) as opposed to integrally formed thereto. The motor case 322 includes a partition member or wall 314 at a rear end 318. The partition member 314 includes at least one aperture 317 at a periphery thereof. The partition member 314 separates the motor case 322 and the handle portion (not shown) in the cavity (not shown). The motor case 322 also having a pocket 320 and a channel 323 formed at the rear end 318. The pocket 320 is positioned between the channel 323 and a back wall 326 and further defines a slot 324. The back wall 326 includes a pair of slots 328. The channel 323 is formed at the rear end 318 between a pair apertures 330.

A top member 332 includes a pair of elongated legs 334, a pair of protrusions 336, and a U-shaped opening 338. The pair of protrusions 336 are positioned towards a front end of the top member 332. The opening 338 is positioned between the pair of elongated legs 334 at a rear end.

With reference to FIG. 15B, installing and fluidly sealing a positional sensor board 300 within the slot 324 of the motor case 322 will be described in detail. The user operatively connects the connector 306 of the positional sensor board 300 with a connector 342 of a wire assembly 344. The user then inserts the positional sensor board 300 in the slot 324 of the pocket 320. The pair of elongated legs 334 and the pair of protrusions 336 of the top member 332 are received in the pair of apertures 330 and the pair of slots 328, respectively, to secure the top member 332 to the rear end 318 of the motor case 322. That is, the top member 332 covers the connectors 306, 342 and the positional sensor board 300 within the channel 323 and the pocket 320, respectively, while allowing a portion of wires 348 of the wire assembly 344 to extend out the U-shaped opening 338. Thus, the top member 332 retains the positional sensor board 300 in place and protects the sensor board 300 from contamination (e.g., debris, fluids, etc.).

Referring now to FIG. 16, an alternate embodiment is provided. The structure and function of the top member 432 may be similar or identical to that of the top member 332, apart from any exceptions described below. This embodiment includes an alternate U-shaped top member 432 having a different sealing technique than the top member 332.

The U-shaped top member 432 includes a pair of legs 434 and a main body 436. Each leg 434 includes an aperture (not shown) and is integrally formed to an end of the main body 436 such that a gap 440 is defined between the legs 434.

With further reference to FIG. 16, installing and fluidly sealing the positional sensor board 300 within the slot 324 of the motor case 322 will be described in detail. The user operatively connects the connector 306 of the positional sensor board 300 with the connector 342 of the wire assembly 344. The user then inserts the positional sensor board 300 within the slot 324. The top member 432 is then secured to the rear end 318 of the motor case 322 by fasteners 442 that are received in the apertures (not shown) of the legs 434 and the apertures 330 at the rear end 318. The main body 436 of the top member 432 covers and retains the positional sensor board 300 in place while the connectors 306, 342 are received in the channel 323. The top member 432 also covers additional gaps around the connectors 306, 342 and the positional sensor board 300 to block or reduce the amount of contamination (e.g., debris, dust, fluids) in the area.

Referring now to FIGS. 17 and 18, another alternate embodiment is provided. The structure and function of the motor case 522 may be similar or identical to that of the motor cases 22, 222, 322, apart from any exceptions described below. This embodiment includes an alternate motor case 522 having an alternative sensor board installation and sealing technique than the motor cases 22, 222, 322.

The motor case 522 may be a separate component that can be threadably attached to handle portion (not shown) as opposed to integrally formed thereto. The motor case 522 mounts a motor (not shown) within, which includes a rotor shaft 578 extending longitudinally through the motor case 522. The motor case 522 includes a partition member or wall 514 and a rectangular shaped shroud member 520 at a rear end 518. The partition member 514 includes a plurality of first apertures 516 at a periphery thereof to permit airflow through the motor case 522 and the handle portion in the cavity (not shown). The partition member 514 also separates the motor case 522 and the handle portion within the cavity.

The shroud member 520 is attached to the partition member 514 at the rear end 518 of the motor case 522. The rotor shaft 578 of the rotor assembly extends through a second aperture (not shown) in the partition wall 514 and into the shroud member 520 attached to the rear end 518. The shroud member 520 includes at least one post 530 therein.

A diametrical sensing magnet 584 includes an outer surface 590 and a flange 591. The flange 591 protrudes outwardly from the outer surface 590 of the sensing magnet 584. The flange 591 includes a sloped surface 592. The sensing magnet 584 is mounted onto an end of the rotor shaft 578 that extends into the shroud member 520. A nut 582 secures the sensing magnet 584 onto the rotor shaft 578. It should be understood that while the sensing magnet 584 is mounted to the end portion of the rotor shaft 578 after the shaft 578 extends longitudinally through motor case 522, the sensing magnet 584 may also be mounted to the end portion of the rotor shaft 578 prior to the shaft 578 extending through the motor case 522. That is, the partition member 514 at the rear end 518 of the motor case 522 may include the second aperture large enough to permit the sensing magnet 584 and the rotor shaft 578 to extend through the motor case 522. This removes the step of having to mount the sensing magnet 584 to the rotor shaft 578 at the rear end 518 after the shaft 578 extends into the shroud member 520.

A substantially rectangular-shaped positional sensor board 500 includes a first end 593 and a second 594. The first end 593 includes a connector case 596. The second end 594 having a semi-circular profile formed in the sensor board 500.

Figure 19:
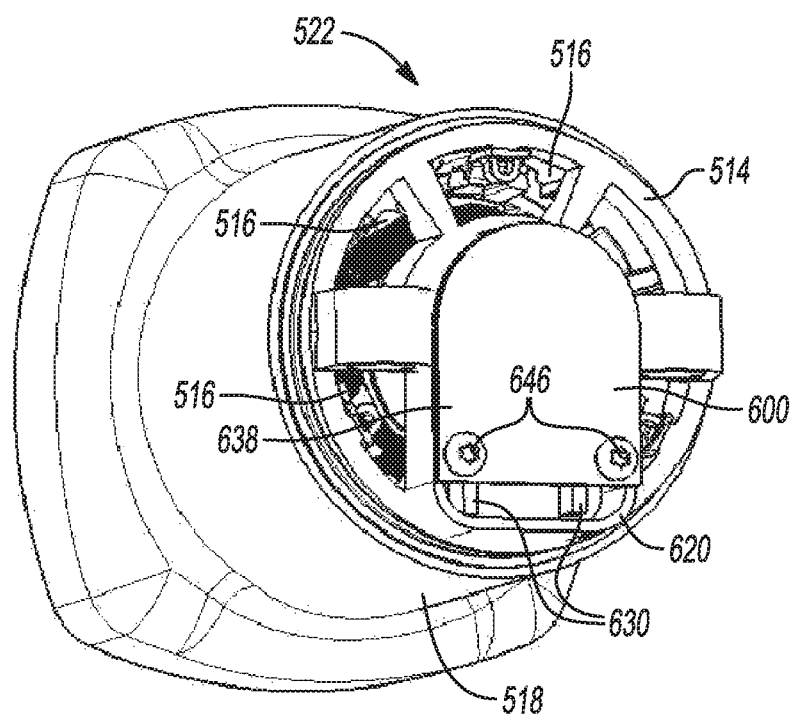
FIG. 19 is a perspective assembled view of the motor case in FIG. 18 with an additional positional sensor board.
Figure 20A:
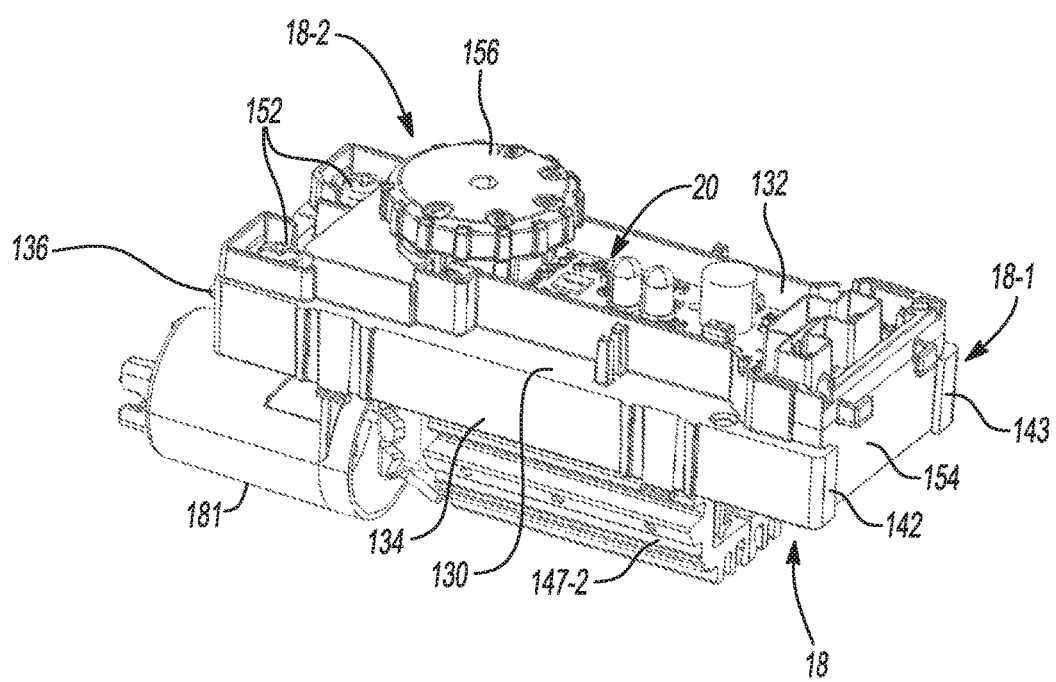
FIGS. 20A and 20B are isometric views of a control side and a power side, respectively, of a power control module in the example embodiment of the handheld grinder.
Figure 20B:
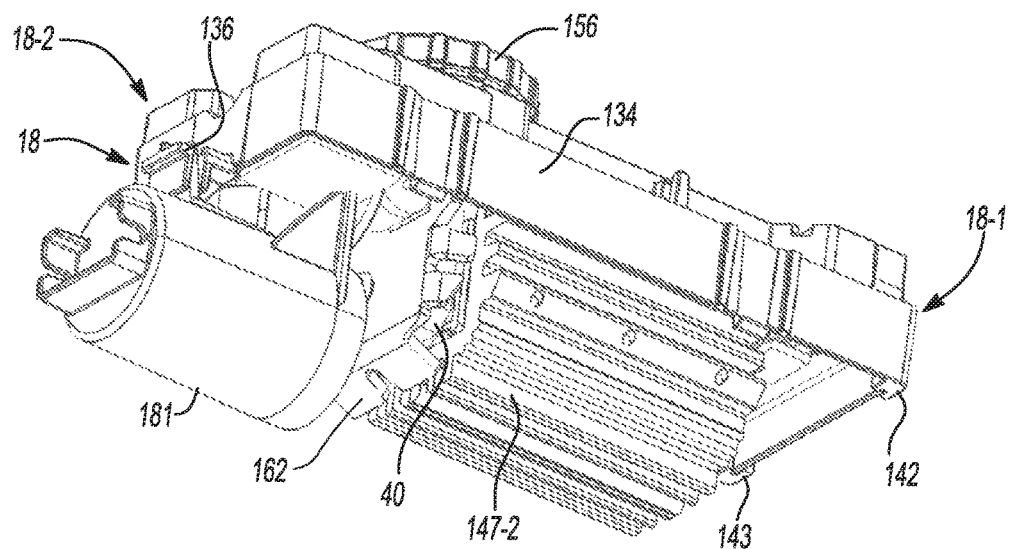
Figure 21:
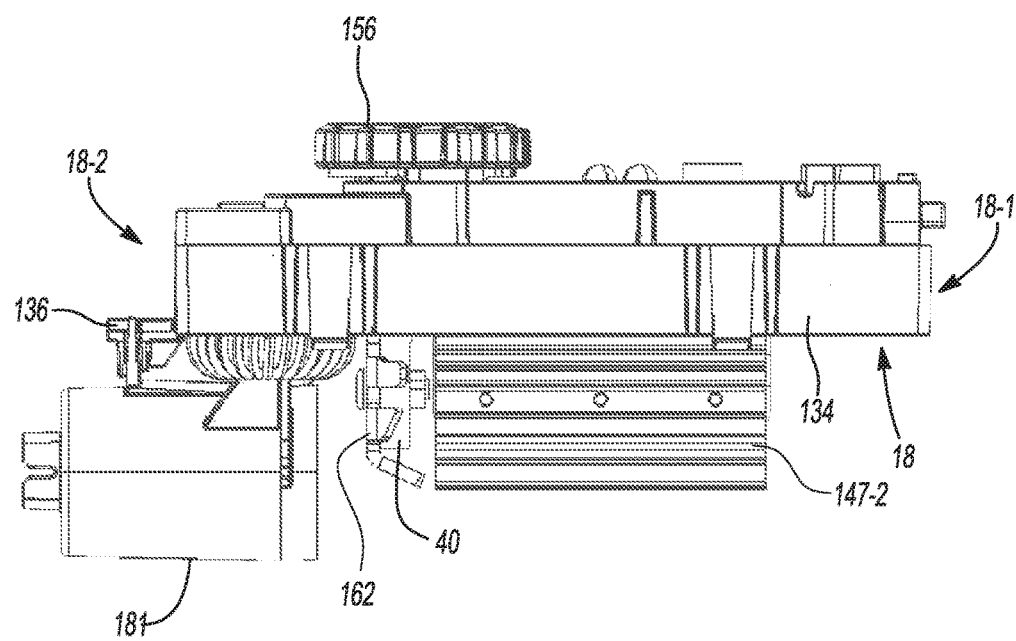
FIG. 21 is a side view of the power control module.

With continued reference to FIG. 18, installing and fluidly sealing the sensor board 500 within the shroud member 520 will be described in detail. The user inserts the positional sensor board 500 inside the shroud member 520 such that the second end 594 is disposed on the surface 592 of the flange 591 of the sensing magnet 584. The connector case 596 at the first end 593 is electrically connected to a connector piece (not shown) of the shroud member 520. This secures the positional sensor board 500 within the shroud member 520 (FIG. 19). The plurality of posts 530 further support the sensor board 500 within the shroud member 520. A rectangular-shaped top member 532 form-fittingly covers and fluidly seals the shroud member 520, thereby protecting the positional sensor board 500 against contamination (e.g., debris, dust, fluids) once connected within the shroud member 520.

Referring now to FIG. 19, another alternate embodiment is provided. The structure and function of the shroud member 620 may be similar or identical to that of the shroud member 520, apart from any exceptions described below. This embodiment includes an alternate shroud member 620 having a different sealing technique than the shroud member 520.

The shroud member 620 is attached to the partition member 514 at the rear end 518 of the motor case 522. The shroud member 620 includes at least one post 630 therein.

A positional sensor board 600 has a substantially similar profile as the shroud member 620 and includes a pair of apertures (not shown) positioned at an end 638 of the positional sensor board 600. Fasteners 646 are received in the pair of apertures in the positional sensor board 600 and a corresponding pair of apertures (not shown) in the shroud member 620 to secure the positional sensor board 600 to the shroud member 620. Once fully secured, the positional sensor board 600 is supported against the at least one post 630 within the shroud member 620 and is self-sealed to prevent contamination (e.g., debris, dust, fluids).

Referring to FIGS. 20A, 20B, 21, 22A, 22B, and 23, the rectangular module casing 18 is provided. The module casing 18 is disposed entirely within the cavity 21 (FIG. 3) of the handle portion 23 of the housing 12. The module casing 18 defines a first end 18-1 and a second end 18-2. The first end 18-1 is positioned adjacent to the motor case 22 (FIG. 3) of the housing 12 and the second end 18-2 of the module casing 18 extends toward the second end 12-2 of the housing 12. The casing 18 also includes a first surface 130, a U-shaped second surface 132, sides 134,135, and a clip 136.

Figure 22A:
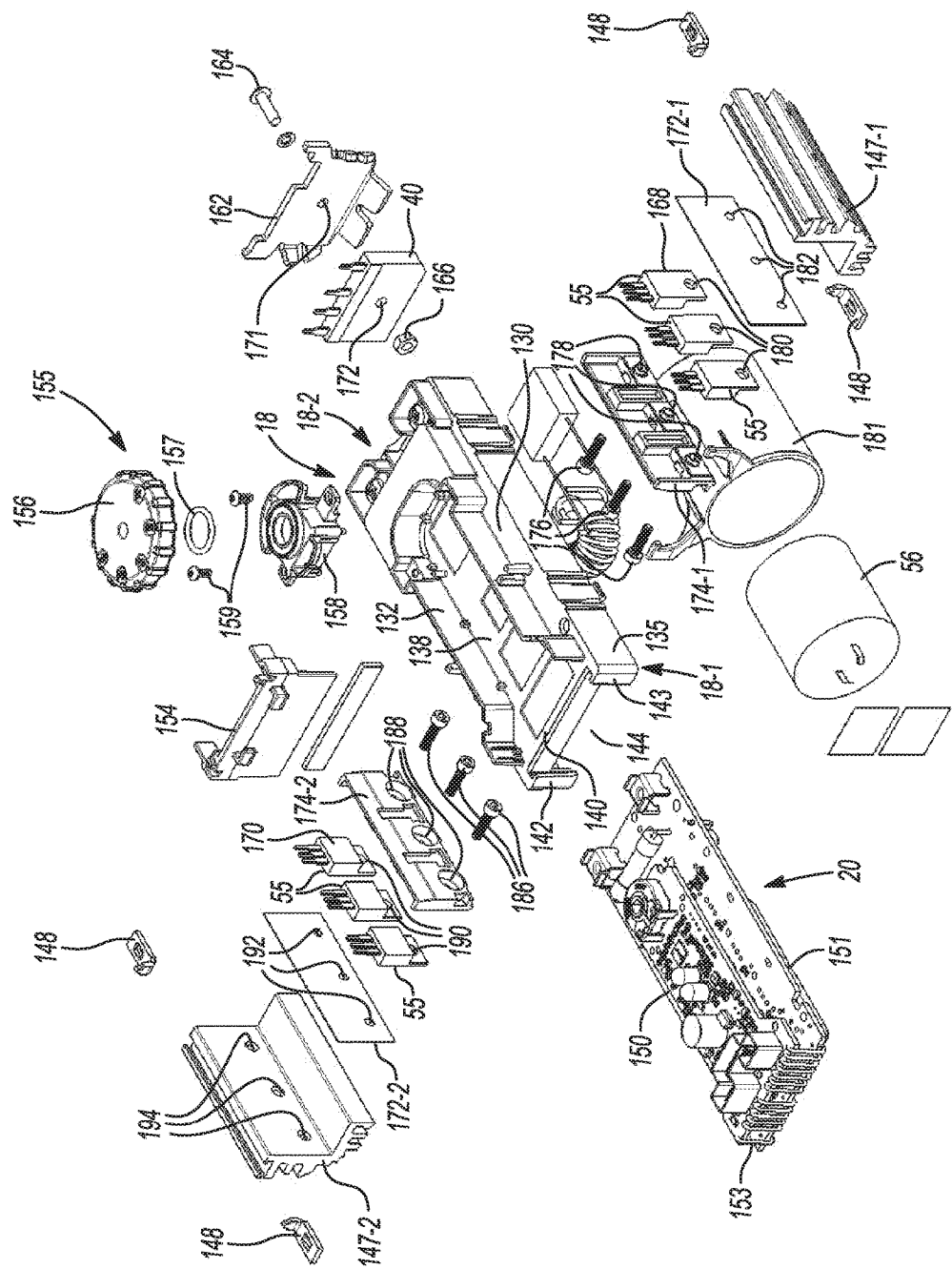
FIGS. 22A and 22B are perspective exploded views of the power control module in normal and upside down orientations, respectively.

The first surface 130 extends parallel to the longitudinal axis of the housing 12 (FIG. 3) and divides the casing 18 between an upper portion and a lower portion. The second surface 132 extends perpendicular from the first surface 132 at the upper portion and forms a cavity 138 having an opening 140 (FIG. 22A). The sides 134, 135 extend perpendicular from the first surface 130 toward the lower portion of the casing 18. Flanges 142, 143 extend from the sides 134, 135, respectively, toward each other at the first end 18-1 of the casing 18 to define an opening 144 at the lower portion. The clip 136 is attached to the casing 18 at the second end 18-2 and extends outwardly therefrom.

Figure 23:
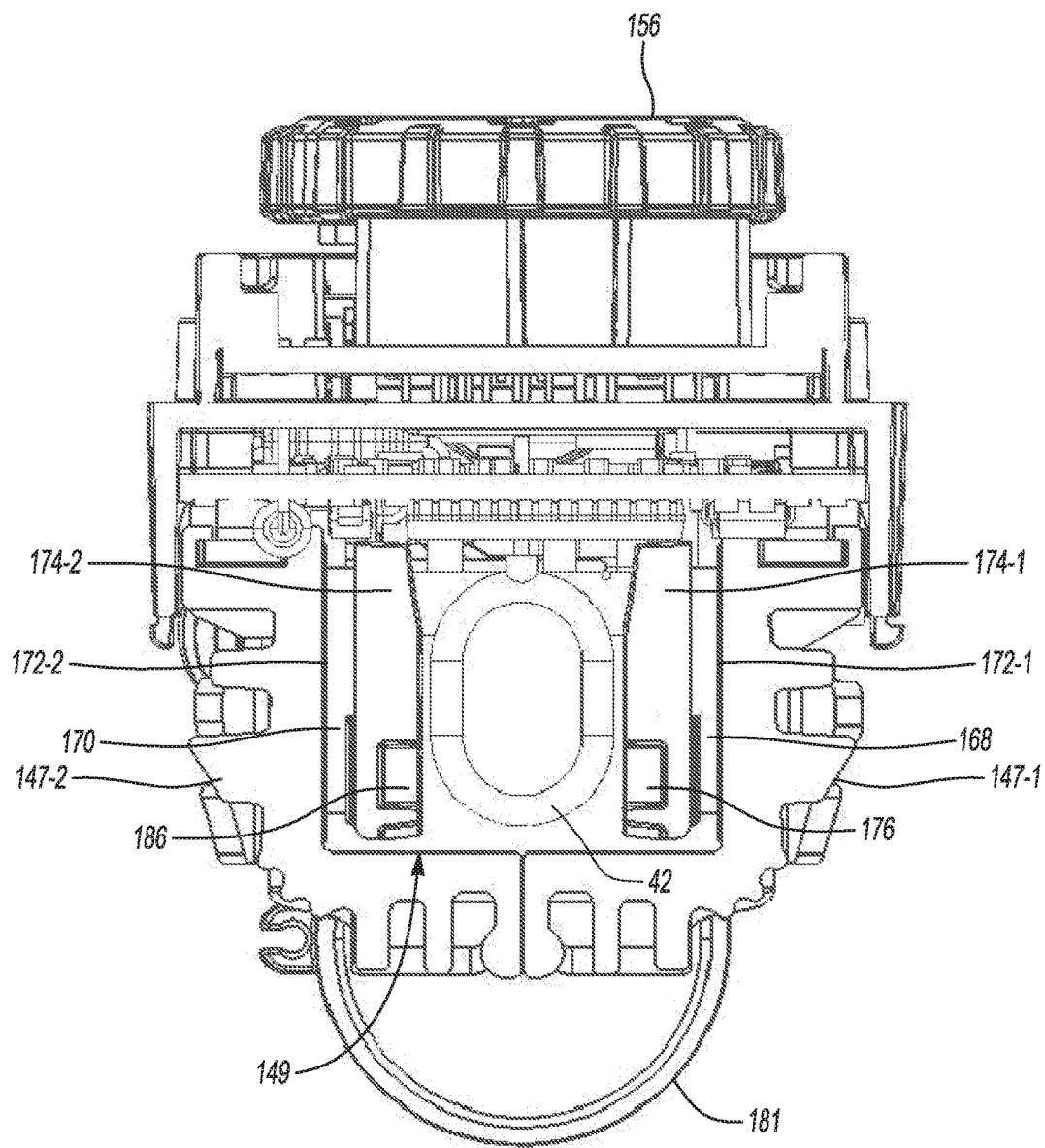
FIG. 23 is a front view of the power control module.
Figure 24A:
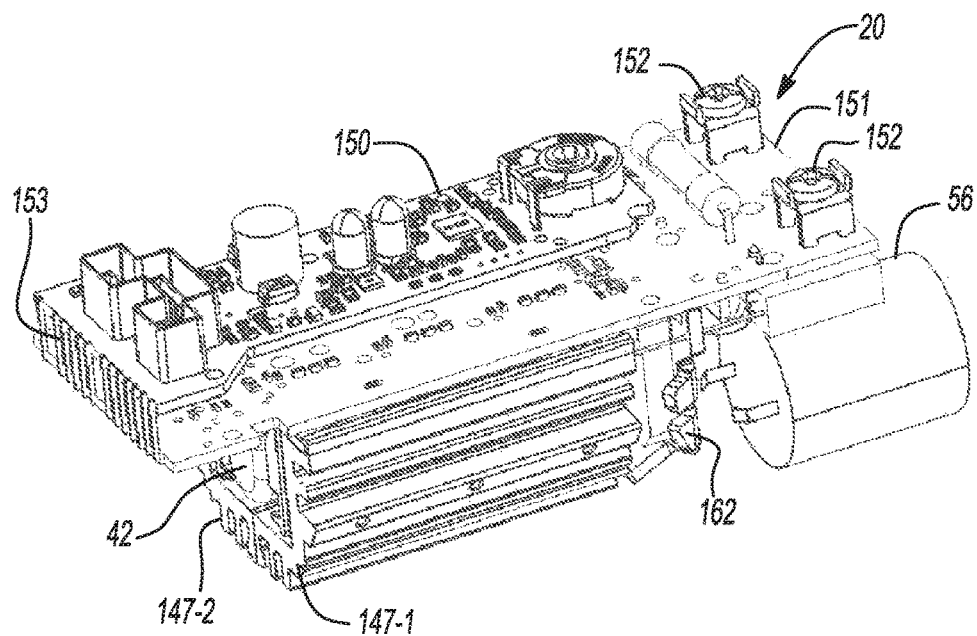
FIGS. 24A and 24B are isometric views of the power control module with casing removed.
Figure 24B:
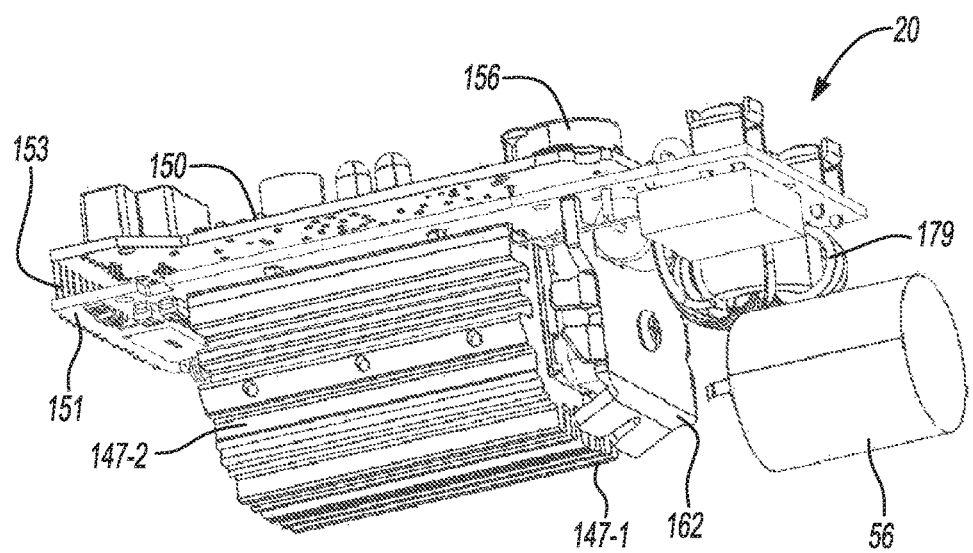

A first L-shaped heat sink 147-1 and a second L-shaped heat sink 147-2 are attached to the bottom portion of the casing 18 by tabs 148. The heat sinks 147-1, 147-2 are attached to the casing 18 such that the heat sinks 147-1, 147-2 abut each other to form a U-shape cavity 149 (FIG. 23).

The planar circuit board 20 is attached to the module casing 18 by fasteners 152 that are attached at the second end 18-2 thereof. The planar circuit board 20 also extends axially along the longitudinal axis of the housing 12 (FIG. 3). The planar circuit board 20 divides the cavity 21 (FIG. 3) of the handle portion 23 between an upper portion and a lower portion. The planar circuit board 20 includes a first board or top segment board 150 and a second board or bottom segment board 151. The first and second boards 150, 151 are interconnected by a hinge section 153 that allow for electrical communication therebetween such that the first board 150 is folded over top of the second board 151 and the first board 150 is affixed to a top surface of the casing 18 and the second board is affixed to a bottom surface of the casing 18.

The hinge section 153 is covered and protected by a cover member 154 positioned at the first end 18-1 of the casing 18. The first board 150 is received in the cavity 138 at the upper portion of the casing 18 via the opening 140 and the second board 151 is positioned at the lower portion of the casing 18.

The planar circuit board 20 includes a dial assembly 155, the rectifier 40, the DC bus capacitors 42, the motor switches 55, and the auxiliary capacitor 56. The dial assembly 155 is attached to the first board 150 of the planar circuit board 20 at the second end 18-2 of the module casing 18. The dial assembly 155 includes a dial 156, a seal 157, a frame 158 and fasteners 159. The dial 156 is attached to the frame 158. The dial 156 may be a potentiometer, for example, that permits the adjusting of current flow through the planar circuit board 20. The seal 157 is positioned between the dial 156 and the frame 158. The frame 158 is attached to the first board 150 by the fasteners 159.

The rectifier 40 is soldered to a bottom surface 160 of the second board 151 between the auxiliary capacitor 56 and the heat sinks 147-1, 147-2. A cover 162 is attached to the rectifier 40 by a fastener 164 that extends through apertures 171, 172 of the cover 162 and the rectifier 40, receptively. The cover 162 separates the rectifier 40 from contacting the auxiliary capacitor 56. A nut 166 further secures the fastener 164, the cover 162, and the rectifier 40 together. The DC bus capacitors 42 are soldered on the bottom surface 160 of the second board 151 in the U-shaped cavity 149 formed by the heat sinks 147-1, 147-2.

The motor switches 55 include a first set containing three adjacently oriented switches 168 and a second set containing three adjacently oriented switches 170. The first set of switches 168 are soldered to the bottom surface 160 of the second board 151 between the heat sink 147-1 and the DC bus capacitors 42. The second set of switches 170 are soldered to the bottom surface 160 of the second board 151 between the heat sink 147-2 and the DC bus capacitors 42.

Figure 22B:
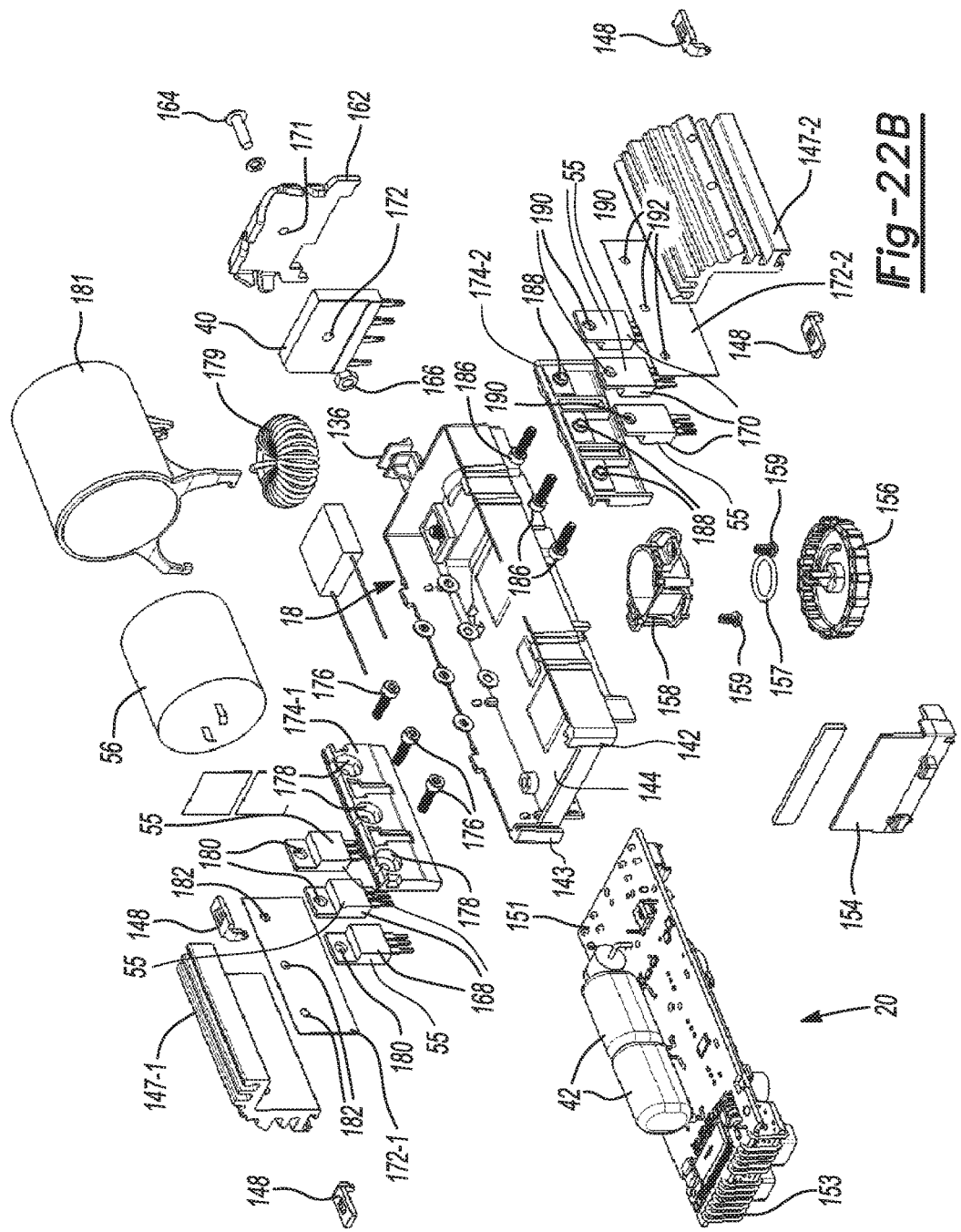

Referring to FIGS. 22A, 22B and 23, a first plate 172-1 is positioned between the first set of switches 168 and the heat sink 147-1 and a second plate 172-2 is positioned between the second set of switches 170 and the heat sink 147-2. The first and second plates 172-1, 172-2 permit heat to flow therethrough to the heat sinks 147-1, 147-2, respectively, while preventing electricity therethrough. A first shielding member 174-1 is positioned between the DC bus capacitors 42 and the first set of switches 168 and a second shielding member 174-2 is positioned between the bus capacitors 42 and the second set of switches 170. A first set of fasteners 176 are securely received in apertures 178, 180, 182, and 184 of the first shielding member 174-1, the first set of switches 168, the first plate 172-1, and the heat sink 147-1, respectively. Similarly, a second set of fasteners 186 are securely received in apertures 188, 190, 192, and 194 of the second shielding member 174-2, the set set of switches 170, the second plate 172-2, and the heat sink 147-2, respectively.

The auxiliary capacitor 56 is soldered to the bottom surface 160 of the second board 151. The capacitor housing 181 is also attached to the clip 136 at the second end 18-2 of the casing 18, so that the capacitor 56 is supported within the support member 30 of the second cover 23*b* (FIG. 2). The capacitor 56 is adjacent to the openings 31 (FIG. 2) of the support member 30 to benefit from the entering airflow therethrough.

Figure 25A:
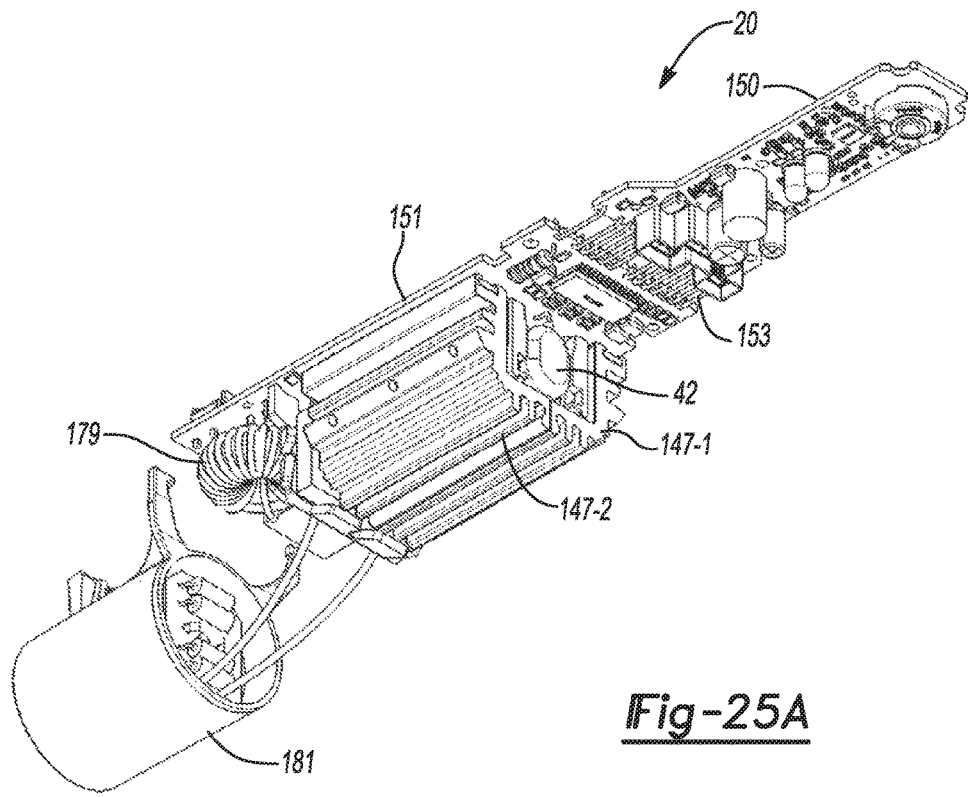
FIGS. 25A and 25B are side views of the control circuit board and the power circuit board in an unfolded and a folded arrangement, respectively.
Figure 25B:
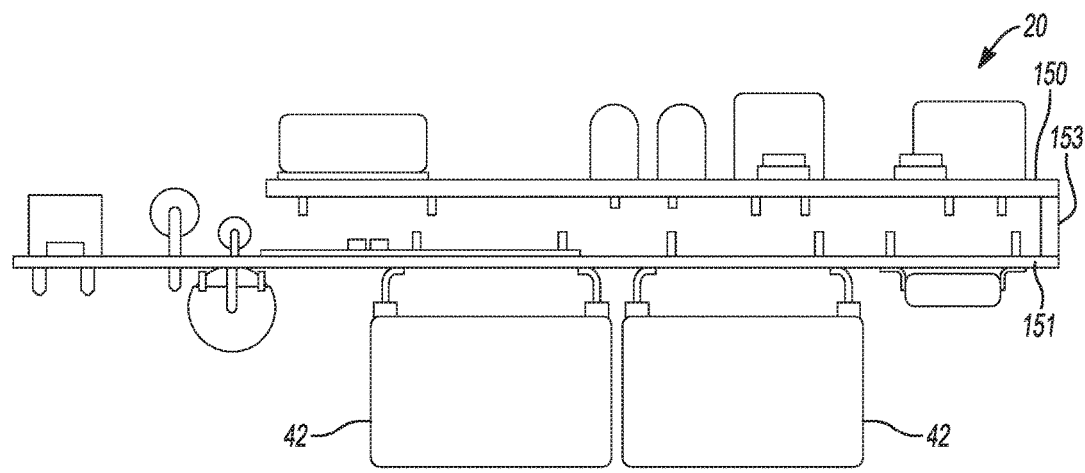

During operation of the power tool 10, the electrical components (e.g., capacitors 42, 56, motor switches 55, rectifier 40) generate heat. The heat sinks 147-1, 147-2 transfer the heat generated by the electrical components to the airflow passing through the area. The placement of the auxiliary capacitor 56 in the support member 30 (FIG. 2) further allows for the incoming air entering through the openings 31 to cool the auxiliary capacitor 56. Thus, the power tool 10 is less vulnerable to overheating issues. Referencing FIGS. 25A and 25B, the planar circuit board 20 may be in folded or unfolded positions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power tool comprising:
    a housing defining a cavity therein, where the housing includes a motor case portion and a non-motor case portion;
    an electric motor having a drive shaft and mounted within the motor case portion of the housing;
    a motor drive circuit accommodated within the non-motor case portion of the housing and configured to drive the electric motor;
    a partition separating the motor case portion from the non-motor case portion of the housing, where the partition is in form of a pocket with an open end facing the motor case portion;
    a rear bearing for the drive shaft, the rear bearing disposed into the open end of the pocket and supported by an inner surface of the pocket;
    one or more sense magnets affixed to the drive shaft, where the one or more sense magnets are arranged along the drive shaft in between the rear bearing and a closed end of the pocket;
    one or more position sensors mounted to a position sense board, where the position sensors cooperate with the one or more sense magnets to sense rotational motion of the drive shaft; and
    a slot formed in the pocket and configured to radially receive the position sense board therein, such that the position sense board is arranged adjacent to the one or more sense magnets inside the pocket.

2. The power tool of claim 1 wherein the slot in the pocket is overmolded and thereby fluidly seals the position sense board in the pocket.

3. The power tool of claim 1 wherein the position sense board includes a mounting area which extends outside the slot and a plurality of wires are attached to the mounting area of the position sense board.

4. The power tool of claim 3 wherein the slot in the pocket is overmolded such that the overmold encases the mounting area of the position sense board.

5. The power tool of claim 4 wherein the position sense board includes an aperture to partially receive the shaft therein.

6. A power tool comprising:
    a housing defining a cavity therein, where the housing includes a motor case portion and a non-motor case portion;
    an electric motor having a drive shaft and mounted within the motor case portion of the housing;
    a motor drive circuit accommodated within the non-motor case portion of the housing and configured to drive the electric motor;
    a partition separating the motor case portion from the non-motor case portion of the housing, where the partition is in form of a pocket with an open end facing the motor case portion;
    a rear bearing for the drive shaft, the rear bearing disposed into the open end of the pocket and supported by an inner surface of the pocket; and
    one or more sense magnets affixed to the drive shaft, where the one or more sense magnets are arranged along the drive shaft in between the rear bearing and a closed end of the pocket,
    wherein the motor drive circuit includes:
        a rectifier configured to receive an alternating current from an alternating current (AC) power source and operable to convert the alternating current to a direct current supplied to a DC power bus;
        a switching arrangement having a plurality of motor switches connected electrically between the rectifier and the electric motor, and operates to deliver the direct current from the rectifier to electric motor;

a link capacitor electrically coupled in parallel with the rectifier and electrically connected between the rectifier and the switching arrangement; and an auxiliary switch path electrically coupled in parallel with the rectifier and electrically connected between the rectifier and the switching arrangement, wherein the auxiliary switch path includes an auxiliary capacitor in series with a switch, such that the capacitance of the auxiliary capacitor is more than capacitance of the link capacitor.

7. The power tool of claim 6 wherein the motor drive circuit further includes a switch control circuit configured to detect voltage of the DC power bus and to control state of the switch in accordance with magnitude of the detected voltage, such that state of the switch creates either a charging path for the auxiliary capacitor or a discharging path for the auxiliary capacitor.

8. The power tool of claim 6 further comprises a power module support structure disposed in the handle portion of the housing and extending axially along the longitudinal axis of the housing, thereby dividing the handle portion into an upper section and a lower section; and a circuit board mounted to the power module support structure, the circuit board having a top board segment integrally interconnected by a hinge section to a bottom board segment, where the top board segment is folded over top of the bottom board segment and the top board segment is affixed to a top surface of the power module support structure and the bottom board segment is affixed to a bottom surface of the power module support structure.

9. The power tool of claim 8 wherein the plurality of motor switches are mounted along two lateral side surfaces of the power module support structure and further includes a heat sink mounted to each of the two lateral side surfaces of the power module support structure, such that the heat sink is adjacent and thermally coupled to the plurality of motor switches.

10. The power tool of claim 8 wherein a microcontroller and the link capacitor are mounted to the top board segment and the auxiliary capacitor is mounted to the bottom board segment.

11. A power tool comprising:

an elongated housing defining a cavity therein, where the housing includes a motor case disposed at a front end thereof and a handle portion extending axially along a longitudinal axis of the housing from the motor case to a rear end of the housing;

an electric motor having a drive shaft and mounted within the motor case, wherein one or more sense magnets are affixed to the drive shaft;

an output shaft drivably coupled to the drive shaft of the electric motor and extending perpendicular to the drive shaft;

a wall separating the cavity between the motor case and the handle portion of the housing, wherein the wall is in form of a pocket with an open end facing the motor case portion and the pocket is sized to receive the electric motor;

one or more position sensors mounted to a position sense board, wherein the position sense board is positioned into a slot formed in the pocket, such that the one or more position sensors are adjacent to the one or more sense magnets and cooperate with the one or more sense magnets to sense rotational motion of the drive shaft; and a motor drive circuit accommodated within the handle portion of the housing and configured to deliver a direct current from a DC power bus to the electric motor.

12. The power tool of claim 11 wherein the slot in the pocket is overmolded and thereby fluidly seals the position sense board in the pocket.

13. The power tool of claim 11 further comprises a cover attached to the pocket, such that the cover encloses the position sense board in the slot.

14. The power tool of claim 11 further comprises a cover attached to the pocket, such that the cover partially encloses the position sense board in the slot.

15. The power tool of claim 11 wherein the motor drive circuit further includes a rectifier configured to receive an alternating current from an alternating current (AC) power source and operable to convert the alternating current to a direct current supplied to the DC power bus;

a switching arrangement having a plurality of motor switches connected electrically between the rectifier and the electric motor, and operates to deliver the direct current from the rectifier to the electric motor;

an auxiliary switch path electrically coupled in parallel with the rectifier and electrically connected between the rectifier and the switching arrangement, wherein the auxiliary switch path includes a switch in series with the auxiliary capacitor; and a switch control circuit configured to detect voltage of the DC power bus and to control state of the switch in accordance with magnitude of the detected voltage, such that state of the switch creates either a charging path for the auxiliary capacitor or a discharging path for the auxiliary capacitor.

16. The power tool of claim 15 further comprises a power module support structure disposed in the handle portion of the housing and extending axially along the longitudinal axis of the housing, where the circuit board includes a top board segment integrally interconnected by a hinge section to a bottom board segment, such that the top board segment is folded over top of the bottom board segment and the top board segment is affixed to a top surface of the power module support structure and the bottom board segment is affixed to a bottom surface of the power module support structure.

17. The power tool of claim 16 wherein the plurality of motor switches are mounted along two lateral side surfaces of the power module support structure and further includes a heat sink mounted to each of the two lateral side surfaces of the power module support structure, such that the heat sink is adjacent and thermally coupled to the plurality of motor switches.

18. The power tool of claim 17 wherein a microcontroller and the link capacitor are mounted to the top board segment and the auxiliary capacitor is mounted to the bottom board segment.

19. The power tool of claim 18 further comprises a speed dial mounted to the top board segment of the circuit board and operable to set rotational speed of the electric motor.

\* \* \* \* \*